US012719553B2

(12) United States Patent
Liu

(10) Patent No.: US 12,719,553 B2
(45) Date of Patent: Aug. 25, 2026

(54) METHOD AND DEVICE IN NODE FOR WIRELESS COMMUNICATIONS

(71) Applicant: QUECTEL WIRELESS SOLUTIONS CO., LTD., Shanghai (CN)

(72) Inventor: Jin Liu, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/356,012

(22) Filed: Oct. 10, 2025

(65) Prior Publication Data

US 2026/0039363 A1 Feb. 5, 2026

Related U.S. Application Data

(63) Continuation of application No. PCT/CN2024/100711, filed on Jun. 21, 2024.

(51) Int. Cl.
*H04B 7/06* (2006.01)

(52) U.S. Cl.
CPC ....... *H04B 7/06952* (2023.05); *H04B 7/0626* (2013.01)

(58) Field of Classification Search
CPC .......................... H04B 7/06952; H04B 7/0626
See application file for complete search history.

(56) References Cited

U.S. PATENT DOCUMENTS

| | | | | |
|---|---|---|---|---|
| 11,115,103 | B2 * | 9/2021 | Guo | H04B 7/0696 |
| 2021/0314128 | A1 * | 10/2021 | Li | H04B 7/088 |
| 2024/0056865 | A1 * | 2/2024 | Sun | H04B 7/0632 |
| 2025/0324293 | A1 * | 10/2025 | Kim | H04W 24/08 |

* cited by examiner

*Primary Examiner* — Wayne H Cai

(74) *Attorney, Agent, or Firm* — Fish & Richardson P.C.

(57) ABSTRACT

A method and a device in a node for wireless communications are provided. The method includes: receiving first configuration signaling, the first configuration signaling indicating a first resource set; performing measurement on the first resource set, the first resource set being located on multiple first-type time instances; transmitting first information, the first information indicating N second-type time instances and multiple pieces of second-type beam information. The multiple first-type time instances precede the N second-type time instances, and N is a positive integer. A measurement result for the first resource set is used to determine the multiple pieces of second-type beam information. The multiple pieces of second-type beam information correspond to the N second-type time instances.

20 Claims, 8 Drawing Sheets

Receive first configuration signaling — S510

Perform measurement on a first resource set — S520

Transmit first information — S530

| Beam information #1 | Start time instance #1 | Duration |
| --- | --- | --- |
| Beam information #2 | Start time instance #2 | Duration |
| ... | | |
| Beam information #$K_T$ | Start time instance #$K_T$ | Duration |

| Beam information #1 | Start time instance #1 | End time instance #1 |
| --- | --- | --- |
| Beam information #2 | Start time instance #2 | End time instance #2 |
| ... | | |
| Beam information #$K_T$ | Start time instance #$K_T$ | End time instance #$K_T$ |

METHOD AND DEVICE IN NODE FOR WIRELESS COMMUNICATIONS

CROSS-REFERENCE TO RELATED APPLICATIONS

This application is a continuation of International Application No. PCT/CN2024/100711, filed on Jun. 21, 2024, the disclosure of which is hereby incorporated by reference in its entirety.

TECHNICAL FIELD

Various embodiments described in this document relate to the technical field of communications, and more particularly, to a method and a device in a node for wireless communications.

BACKGROUND

In certain beam management scenarios, a terminal device may predict downlink transmit beams and report the predictions to a network device. For example, the terminal device may predict inference results at multiple time instances and report the results. The inference result information at each time instance includes at least beam information of K strong beams. The K strong beams at different time instances may differ. In such scenarios, how the terminal device reports inference results for multiple time instances becomes a technical problem to be solved.

SUMMARY

A method and a device in a node for wireless communications are provided according to embodiments of the present disclosure. Various aspects of the present disclosure are described below.

According to a first aspect, a method implemented in a first node for wireless communications is provided. The method includes: receiving a first configuration signaling, the first configuration signaling indicating a first resource set; performing measurement on the first resource set, the first resource set being located on multiple first-type time instances; and transmitting first information, the first information indicating N second-type time instances and multiple pieces of second-type beam information. The multiple first-type time instances precede the N second-type time instances, and N is a positive integer. A measurement result for the first resource set is used to determine the multiple pieces of second-type beam information, and the multiple pieces of second-type beam information correspond to the N second-type time instances.

According to a second aspect, a method implemented in a second node for wireless communications is provided. The method includes: determining first configuration signaling, the first configuration signaling indicating a first resource set; performing beam transmission based on the first resource set, the first resource set being located on multiple first-type time instances; and receiving first information, the first information indicating N second-type time instances and multiple pieces of second-type beam information. The multiple first-type time instances precede the N second-type time instances, and N is a positive integer. A measurement result for the first resource set is used to determine the multiple pieces of second-type beam information; and the multiple pieces of second-type beam information correspond to the N second-type time instances.

According to a third aspect, a first node for wireless communications is provided. The first node includes: a first transceiver, configured to receive first configuration signaling, the first configuration signaling indicating a first resource set; and a first processor, configured to perform measurement on the first resource set, the first resource set being located on multiple first-type time instances. The first transceiver is further configured to transmit first information, and the first information indicates N second-type time instances and multiple pieces of second-type beam information. The multiple first-type time instances precede the N second-type time instances, and N is a positive integer. A measurement result for the first resource set is used to determine the multiple pieces of second-type beam information, and the multiple pieces of second-type beam information correspond to the N second-type time instances.

According to a fourth aspect, a second node for wireless communications is provided. The second node includes: a second processor, configured to determine first configuration signaling, the first configuration signaling indicating a first resource set; and a second transceiver, configured to perform beam transmission based on the first resource set, the first resource set being located on multiple first-type time instances. The second transceiver is further configured to receive first information, and the first information indicates N second-type time instances and multiple pieces of second-type beam information. The multiple first-type time instances precede the N second-type time instances, and N is a positive integer. A measurement result for the first resource set is used to determine the multiple pieces of second-type beam information, and the multiple pieces of second-type beam information correspond to the N second-type time instances.

According to a fifth aspect, a first node for wireless communications is provided. The first node includes a transceiver, a memory, and a processor. The memory is configured to store a program, and the processor is configured to call the program stored in the memory and control the transceiver to receive or transmit signals, so as to cause the first node to perform the method as described in the first aspect.

According to a sixth aspect, a second node for wireless communications is provided. The second node includes a transceiver, a memory, and a processor. The memory is configured to store a program, and the processor is configured to call the program stored in the memory and control the transceiver to receive or transmit signals, so as to cause the second node to perform the method as described in the second aspect.

According to a seventh aspect, a communication system is provided according to some embodiments of the present disclosure. The system includes the above-described first node and/or second node. In another possible implementation, the system may further include other devices that interact with the first node or the second node as provided in the embodiments of the present disclosure.

According to an eighth aspect, a computer-readable storage medium is provided according to some embodiments of the present disclosure. The computer-readable storage medium stores a computer program, the computer program being configured to cause a computer to implement some or all of the operations of the method according to any of the aspects described above.

According to a ninth aspect, a computer program product is provided according to some embodiments of the present disclosure. The computer program product includes a non-transitory computer-readable storage medium storing a computer program, the computer program being operable to cause a computer to implement some or all of the operations of the method according to any of the aspects described above. In some implementations, the computer program product may be a software installation package.

According to a tenth aspect, a chip is provided according to some embodiments of the present disclosure. The chip includes a memory and a processor. The processor is configured to call and run a computer program from the memory to implement some or all of the operations of the method as described in any of the aspects above.

In the embodiments of the present disclosure, a first node may determine a first resource set located on multiple first-type time instances based on first configuration signaling, and perform measurement on the first resource set. Based on the measurement result, the first node may indicate N second-type time instances and corresponding second-type beam information by transmitting first information. The N second-type time instances are not earlier than any of the first-type time instances. Therefore, the first node may predict the N second-type time instances based on the multiple first-type time instances. The first information facilitates the first node in efficiently reporting strong beam information corresponding to the predicted second-type time instances, thereby reducing signaling overhead and improving resource utilization.

In the embodiments of the present disclosure, when the beam information includes predicted signal quality (e.g., reference signal received power (RSRP)), the first node may further report quality information corresponding to the strong beams on the N second-type time instances. This is beneficial to improving resource utilization.

DETAILED DESCRIPTION OF THE EMBODIMENTS

Communication System Architecture

Figure 1:
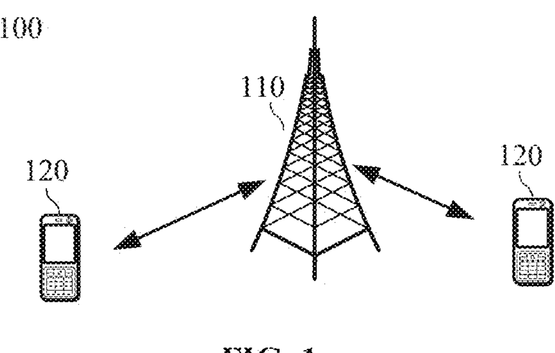
FIG. 1 is a schematic diagram of a system architecture of a wireless communication system applicable to some embodiments of the present disclosure.

FIG. 1 is a schematic diagram illustrating an example system architecture of a wireless communication system 100 applicable to embodiments of the present disclosure. The wireless communication system 100 may include a network device 110 and a terminal device 120. The network device 110 may be a device that communicates with the terminal device 120. The network device 110 may provide communication coverage for a specific geographical area and may communicate with terminal devices 120 located within the coverage.

FIG. 1 exemplarily illustrates one network device and two terminal devices. Optionally, the wireless communication system 100 may include multiple network devices, and each network device may cover a respective area in which a different number of terminal devices are included. The embodiments of the present disclosure are not limited in this regard.

Optionally, the wireless communication system 100 may further include other network entities, such as a network controller, a mobility management entity, and the like. The embodiments of the present disclosure are not limited in this respect.

It should be understood that the technical solutions provided in the embodiments of the present disclosure may be applied to various communication systems, such as a Fifth Generation (5G) system or a New Radio (NR) system, a Long Term Evolution (LTE) system, an LTE Frequency Division Duplex (FDD) system, an LTE Time Division Duplex (TDD) system, and the like. The technical solutions provided in the present disclosure may also be applicable to future communication systems, such as a Sixth Generation (6G) mobile communication system, a satellite communication system, and so on.

In the embodiments of the present disclosure, the terminal device may also be referred to as user equipment (UE), an access terminal, a user unit, a user station, a mobile station (MS), a mobile terminal (MT), a remote station, a remote terminal, a mobile device, a user terminal, a terminal, a wireless communication device, a user agent, or a user apparatus. The terminal device in the embodiments of the present disclosure may be a device that provides voice and/or data connectivity to a user, and may be used to connect people, things, or machines. Examples include handheld devices and in-vehicle devices with wireless connectivity capabilities. The terminal device in the embodiments of the present disclosure may be, for example, a mobile phone, a tablet (Pad), a laptop, a palmtop computer, a mobile internet device (MID), a wearable device, a virtual reality (VR) device, an augmented reality (AR) device, or a wireless terminal used in industrial control, self-driving systems, remote medical surgery, smart grids, transportation safety, smart cities, smart homes, and so on. Optionally, the terminal device may be used as a base station. For example, the terminal device may act as a scheduling entity that provides sidelink signals among UEs in vehicle-to-everything (V2X) or device-to-device (D2D) communication. For instance, a cellular phone and a car may communicate with each other using sidelink signals. Similarly, a cellular phone may communicate directly with a smart home device without relaying communication signals via a base station.

The network device in the embodiments of the present disclosure may be a device used to communicate with a terminal device, and the network device may also be referred to as an access network device or a radio access network device. For example, the network device may be a base station (BS). The network device in the embodiments of the present disclosure may be a radio access network (RAN) node (or device) that accesses user equipment to a radio network. The base station may broadly cover various names in the following, or may be replaced with the following names: A node B (NodeB), an evolved NodeB (eNB), a next-generation base station (next generation NodeB, gNB), a relay station, a transmitting and receiving point (TRP), a transmitting point (TP), a master station (MeNB), a secondary station (SeNB), a multimode radio (MSR) node, a home base station, a network controller, an access node, a wireless node, an access point (AP), a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. The base station may further refer to a communication module, a modem, or a chip that is configured to be disposed in the foregoing device or apparatus. The base station may further be a mobile switching center, D2D, V2X, a device that undertakes a base station function in machine-to-machine (M2M) communication, a network side device in a 6G network, a device that undertakes a base station function in a future communication system, or the like. The base station may support networks using the same or different access technologies. The embodiments of the present disclosure are not limited to specific implementations or physical forms of the network device.

The base station may be stationary or mobile. For example, a helicopter or an unmanned aerial vehicle may be configured to function as a mobile base station, and one or more cells may move based on the position of the mobile base station. In other examples, the helicopter or the unmanned aerial vehicle may be configured to function as a device that communicates with another base station.

In some deployment scenarios, the network device in the embodiments of the present disclosure may refer to a CU or a DU, or the network device may include both a CU and a DU. The gNB station may further include an AAU.

The network device and the terminal device may be deployed on land, indoor or outdoor, and may be handheld or vehicle-mounted. They may also be deployed on the surface of water, or in the air on aircraft, balloons, or satellites. The embodiments of the present disclosure are not limited to specific deployment scenarios for the network device or the terminal device.

It should be understood that all or part of the functions of the communication device in the present disclosure may be implemented through software functions running on hardware, or through virtualized functions instantiated on a platform (such as a cloud platform).

It should also be understood that the interpretation of terminology in the embodiments of the present disclosure may refer to the specifications and protocols of the third generation partnership project (3GPP), including but not limited to the TS36 series, TS37 series, and TS38 series, and may also refer to the specifications and protocols of the Institute of Electrical and Electronics Engineers (IEEE).

For ease of understanding, relevant technical knowledge involved in the embodiments of the present disclosure is introduced below. The following related technologies may be optionally combined with the technical solutions in the embodiments of the present disclosure in any manner, and all such combinations fall within the scope of protection of the present disclosure. The embodiments of the present disclosure include at least part of the following content.

Beam Management

With the development of communication technologies, the application scope of artificial intelligence (AI)/machine learning (ML) technologies in communication scenarios is continuously expanding. For example, 3GPP Release 18 (Rel-18) has already started studying the application of AI/ML technologies in the NR air interface (also referred to as air interface), and has formulated the study report TR38.843. This report defines three typical use cases, including: channel state information (CSI) feedback enhancement, beam management (BM), and positioning accuracy enhancements.

In order to promote the application of AI/ML technologies, 3GPP formally initiated the standardization work targeting AI/ML technologies for the NR air interface in Rel-19 through proposal RP-240774. Exemplarily, the standardization work for beam management includes predicting the downlink transmit beam (DL Tx beam). Exemplarily, the training and prediction of the AI/ML model can be located on the UE/terminal device side, that is, a UE-side/terminal-side model. Exemplarily, the training and prediction of the AI/ML model can be located on the network (NW) side, that is, a network-side model (NWI-side model).

As an example, beam management mainly includes two sub-use cases: spatial-domain beam management and temporal-domain beam management. Spatial-domain beam management, i.e., BM-Case1, mainly involves spatial-domain downlink beam prediction of Set A of beams based on measurement results of Set B of beams. Temporal-domain beam management, i.e., BM-Case2, mainly involves temporal downlink beam prediction of Set A of beams based on historical measurement results of Set B of beams.

As an example, Set B is a set of beams whose measurement results are used as inputs to an AI/ML model. Set A is also a set of beams, and the output of the AI/ML model is a prediction for Set A. The beams in Set A and Set B may be within the same frequency range.

As an example, relevant reports (e.g., TR38.843) provide the following recommendations regarding the application of AI/ML in BM-Case2.

Recommendation 1: The relationship between Set A and Set B should account for the following three scenarios. In the first scenario, Set A and Set B are different, and Set B is not a subset of Set A. In the second scenario, Set A and Set B are different, and Set B is a subset of Set A. In the third scenario, Set A and Set B are identical.

Recommendation 2: As inputs to the AI/ML model, the latest K ($K \geq 1$) measurement instances should be considered, with the following options available. Option 1: Determining the model input based solely on the layer 1 reference signal received power (L1-RSRP) measurements of Set B. Option 2: Determining the model input based on the L1-RSRP measurements of Set B along with auxiliary information. Option 3: Determining the model input based on the L1-RSRP measurements of Set B together with the corresponding downlink transmit beam and/or receive beam identities (IDs). From the above, it is clear that the inputs to the AI/ML model must include the L1-RSRP measurement results based on Set B.

Recommendation 3: The outputs of the AI/ML model may include F predictions for F future time instances (also referred to as temporal instances), with each prediction corresponding to a respective time instance. Here, F is greater than or equal to 1.

Optionally, the temporal beam prediction process may include two phases: an observation phase and a prediction phase. The observation phase may also be referred to as an observation window or observation period. The prediction phase may also be referred to as a prediction window or prediction period.

For ease of understanding, an exemplary description of the temporal beam prediction method in the context of BM-Case2 is provided below with reference to FIG. 2 and FIG. 3. It should be understood that the embodiments of the present disclosure are discussed by way of example with respect to the BM-Case2 scenario. In other words, the technical solutions described in the embodiments of the present disclosure are not limited to the BM-Case2 scenario and may also be applicable to the BM-Case1 scenario.

Figure 2:
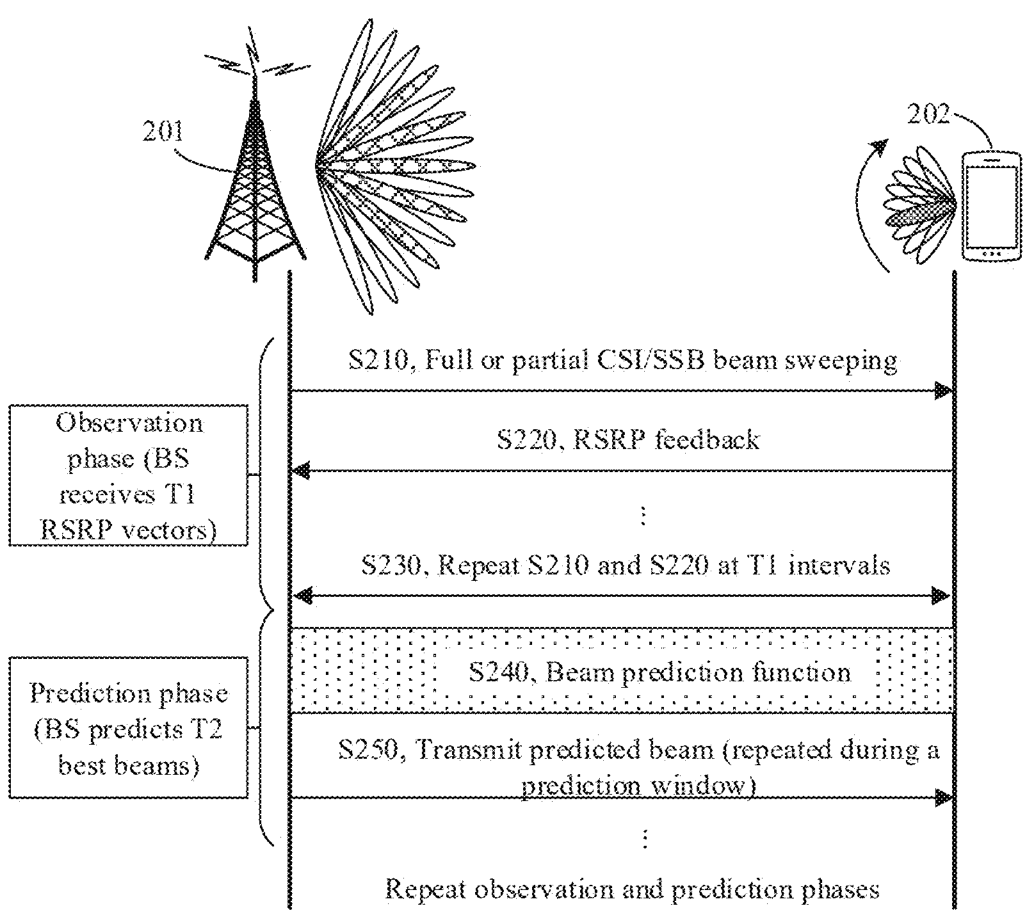
FIG. 2 is a schematic flow chart of a time-domain beam prediction method applicable to some embodiments of the present disclosure.

FIG. 2 is a schematic flow chart of a temporal beam prediction method using Layer 1 reference signal received power. FIG. 3 is a schematic diagram illustrating temporal beam prediction based on AI/ML. The method shown in FIG. 2 may be used to predict future transmit and/or receive beams on the base station (gNB/BS) side and/or the terminal device side. The beam prediction model (for example, an AI/ML model) shown in FIG. 2 and FIG. 3 may be implemented on the base station side, or on the terminal device side, or on both the base station side and the terminal device side.

Referring to FIG. 2, in S210, the base station 201 performs beam sweeping toward the terminal device 202. The beams may be CSI beams or synchronization signal block (SSB) beams. Herein, SSB may also refer to a synchronization signal and physical broadcast channel block (SS/PBCH block). In S210, the base station 201 may perform a full or partial CSI/SSB beam sweep.

In S220, the terminal device 202 transmits RSRP feedback to the base station 201.

In S230, S210 and S220 are repeated at T1 time intervals.

In S240, a beam prediction function is performed.

In S250, the base station 201 transmits to the terminal device 202 with predicted beams, and this transmission is repeated within a prediction window.

S210 to S230 in FIG. 2 belong to the observation phase, during which the base station 201 receives T1 RSRP vectors. S240 and S250 belong to the prediction phase. For example, during this phase, the base station 201 predicts T2 best beams. The base station 201 and the terminal device 202 may repeat the observation phase and the prediction phase (i.e. repeat observation and prediction window).

Figure 3:
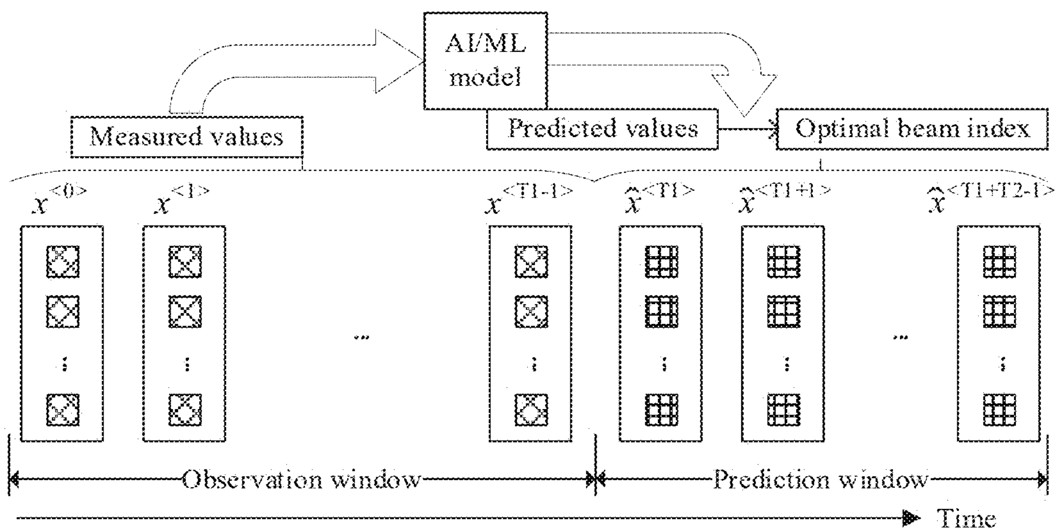
FIG. 3 is a schematic diagram illustrating time-domain beam prediction based on AI/ML.

FIG. 3 is a schematic diagram of temporal beam prediction based on an AI/ML model. In FIG. 3, the time axis is shown as the horizontal axis. For the device where the AI/ML model resides, multiple measurement values associated with the Set B of beams may be collected during the observation window as input values to the AI/ML model. The AI/ML model may output multiple predicted values within the prediction window for the Set A of beams. The multiple predicted values may be used to determine the best beam indexes.

As shown in FIG. 3, within the observation window, T1 measurement values may be collected, and are denoted as $x^{<0>}, x^{<1>}, \ldots, x^{<T1-1>}$. These T1 measurement values serve as the input to the AI/ML model, and T2 predicted values within the prediction window, denoted as $\hat{x}^{<T1>}, \hat{x}^{<T1+1>}, \ldots, \hat{x}^{<T1+T2-1>}$ may be output. Based on the T2 predicted values, the best beam indexes may be determined.

As shown in FIG. 2 and FIG. 3, during the observation phase, the T1 measurement results (such as L1-RSRP) obtained from the Set B of beams within the observation window are collected and inputted into the AI/ML model. In the prediction phase, the AI/ML model may generate T2 predicted results (such as L1-RSRP) for the Set A of beams within the prediction window. These predicted results are used to infer the best beam or the best set of beams.

It should be noted that, when the AI/ML model is located on the terminal device side (UE side), the terminal device may directly input the collected measurement results into the AI/ML model for prediction, without the need to report a large amount of measurement data, thus saving resource overhead. However, the inference results of the UE-side model still need to be reported to the network or base station. The content of the reported model inference results has reached a preliminary consensus.

By way of example, according to the consensus reached in 3GPP RAN1 #116 and RAN #116bis, in the spatial beam management (BM-Case1) scenario, the content of the report regarding the inference results of the UE-side AI/ML model includes the following options.

Option 1: The report includes the beam information of the top-K strong beams (Top-K beams) (where K≥1) from Set A.

Option 2: The report includes the beam information and RSRP of the top-K beams from Set A.

Further study Option 3: The report includes the beam information and probability information of the top-K beams from Set A.

Further study Option 4: The report includes the beam information, RSRP, and confidence information of the RSRP, of the top-K beams from Set A.

The predicted RSRP of the Top-K beams may be the predicted RSRP outputted by the AI/ML model, or may be the measured L1-RSRP.

By way of example, according to the consensus reached in the 3GPP RAN1 #116bis meeting, in the context of time-domain beam management (BM-Case2), the reporting content of the inference results from the UE-side AI/ML model supports multiple implementation options. For instance, it is supported that a single inference result report may include inference results for N future time instances (N≥1). In another example, the inference result information for each time instance may correspond to an inference report as defined in spatial beam management (BM-Case1), i.e., the inference result information for each time instance includes at least the beam information of the Top-K beams. In a further example, the RSRP of the predicted beams in the inference result report corresponds to the predicted RSRP outputted by the UE-side AI/ML model.

As described above, the terminal device may predict inference results for multiple time instances and report them. The inference result information for each time instance includes at least the beam information of K strong beams (Top-K beams). The Top-K beams may vary across different time instances.

Figure 4:
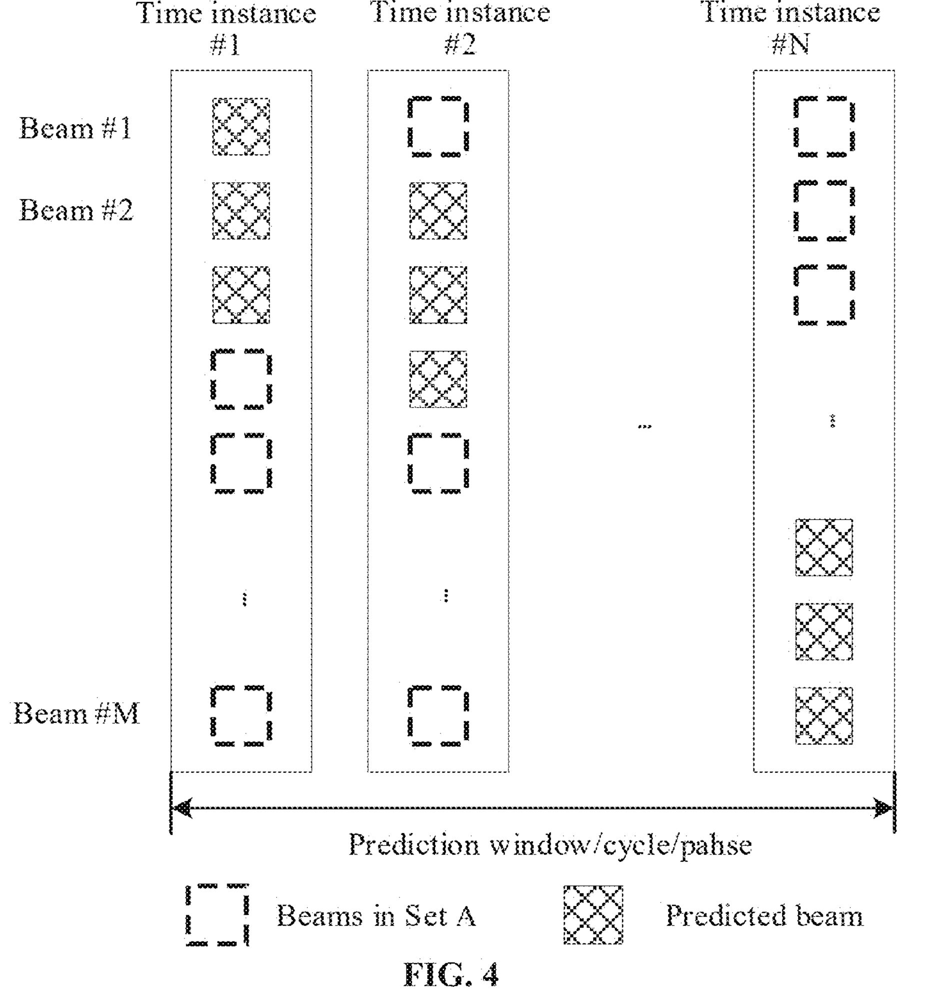
FIG. 4 is a schematic diagram of a possible prediction result of time-domain beam prediction.

To facilitate understanding, an example of possible prediction results for temporal beam prediction is illustrated below with reference to FIG. 4. FIG. 4 illustrates N time instances for M beams, where the M beams are denoted as beam #1, beam #2, . . . , beam #M, and the N time instances are denoted as time instance #1, time instance #2, . . . , time instance #N. Within the prediction window, the prediction result for each time instance includes one or more predicted beams among the M beams. Beams other than the predicted beams among the M beams belong to the Set A of beams.

Referring to FIG. 4, it is assumed that for each of the N time instances, Top-$K_i$ beams are predicted, where i=1, . . . , N. For time instance #1, the Top-$K_1$ beams include beam #1 to beam #3. For time instance #2, the Top-$K_2$ beams do not include beam #1. Similarly, for time instance #N, the Top-$K_n$ beams do not include beam #1. This indicates that the beams predicted at time instance #1 are at least partially different from those predicted at time instance #2 and time instance #N.

In such a scenario, how the terminal device reports the inference results becomes a technical problem that needs to be solved. For example, in a scenario where UE-side AI/ML models are used to predict temporal downlink beams, it is necessary to consider how to efficiently report the information of multiple strong beams across multiple time instances.

By way of example, when the Top-$K_i$ beams differ across at least two time instances, it becomes crucial to determine how to report different Top-$K_i$ beams, and how to establish a correspondence between the N time instances and the respective N sets of Top-$K_i$ beams within the inference result report.

In addition, under the temporal downlink beam prediction scenario based on UE-side AI/ML models, it is also necessary to consider how to efficiently report the strong beam information and the corresponding RSRP values for multiple time instances.

By way of example, if the UE-side AI/ML model outputs a predicted RSRP value for each beam at each of the N time instances, it is further necessary to consider: how to efficiently report these predicted RSRP values, and how to associate them with the N sets of Top-$K_i$ beams.

In view of the above issues, embodiments of the present disclosure provide a method and a device in a node for wireless communications. In the method, a first node (e.g., a UE) may perform measurements on a first resource set located at a first-type of time instances based on first configuration signaling. After performing prediction based on the measurement results, the first node may transmit, via first information, N second-type time instances and multiple pieces of second-type beam information. Accordingly, the first information indicates multiple time instances and the corresponding beam information, thereby enabling efficient reporting of multiple strong beams and/or corresponding RSRP information for multiple time instances, reducing signaling overhead and improving resource utilization.

It should be understood that the reporting method for the prediction results based on the UE-side AI/ML model described above is not only applicable to time-domain beam management scenarios, but is also applicable to spatial beam management scenarios. In addition, although the embodiments of the present disclosure primarily discuss the case of a UE-side model, the proposed solutions are not limited to UE-side models. The solutions may also be applied to NW-side models, or to scenarios involving both UE-side and NW-side models.

It should be noted that the beam referred to in the embodiments of the present disclosure may include, or be replaced by, at least one of the following: a physical beam, a logical beam, a spatial filter, a spatial parameter, a spatial domain filter, a spatial domain transmission filter, a spatial domain reception filter, and an antenna port.

Figure 5:
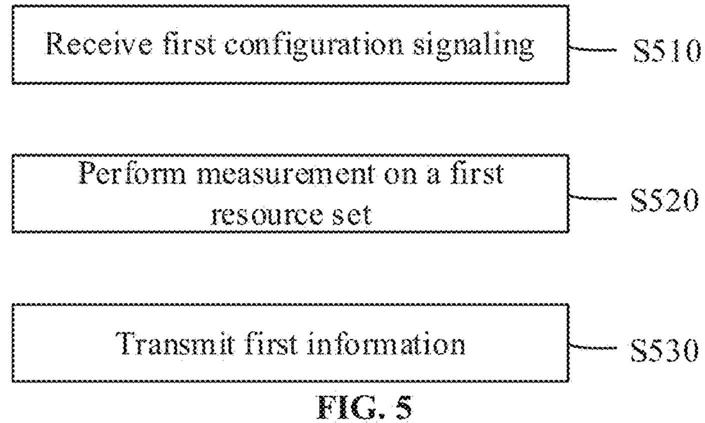
FIG. 5 is a schematic flow chart of a method in a first node for wireless communications according to some embodiments of the present disclosure.

The method embodiments of the present disclosure are described in detail below with reference to the accompanying drawings. FIG. 5 is a flow diagram illustrating a method implemented in a first node for wireless communications according to some embodiments of the present disclosure. As shown in FIG. 5, the method is implemented by the first node.

In some embodiments, the first node may be a network-controlled repeater (NCR).

In some embodiments, the first node may be a terminal device, for example, the terminal device 120 shown in FIG. 1.

In some embodiments, the first node may be a relay, for example, a relay terminal.

In some embodiments, the first node may be equipped with an AI/ML model to perform temporal beam prediction or spatial beam prediction. When the AI/ML model is a UE-side model, the first node may be a UE. When the AI/ML model is a network-side model, the first node may be a base station.

The method shown in FIG. 5 includes operations S510 to S530, which are described in detail below.

In S510, the first node receives first configuration signaling. The first node may receive the first configuration signaling in various ways. In some embodiments, the first node may receive the first configuration signaling configured by a higher layer. For example, the first node may determine the first configuration signaling based on higher-layer configuration information. In some embodiments, the first node may directly receive the first configuration signaling transmitted by a second node.

In some embodiments, the first configuration signaling is configured by a higher layer. The higher layer may include, but is not limited to, the radio resource control (RRC) layer, the media access control (MAC) layer, and the like. In some embodiments, the first configuration signaling includes higher-layer signaling. In some embodiments, the first configuration signaling includes RRC-layer signaling. For example, the first configuration signaling may be RRC-layer signaling. In some embodiments, the first configuration signaling includes MAC-layer signaling. For example, the first configuration signaling may be MAC-layer signaling.

In some embodiments, the second node may be a network device, for example, the network device 110 shown in FIG. 1.

In another embodiment, the second node may be another terminal device that communicates with the first node via sidelink communications.

In some embodiments, the first node may determine the method of receiving the first configuration signaling based on pre-configured or dynamically configured settings.

The first configuration signaling is used to indicate the first resource set. Any resource within the first resource set may be a time domain resource, frequency domain resource, or spatial resource, or a combination of multiple resources, without limitation.

In some embodiments, some or all of the resources within the first resource set are used for signal transmission. The signal transmitted using the first resource set may be an uplink signal, a downlink signal, or a sidelink signal.

In some embodiments, the first resource set includes multiple resources, and these resources are used for downlink signal transmission. For example, the multiple resources in the first resource set are used for the network device to transmit downlink signals to the terminal device. As a sub-embodiment of the above embodiments, the downlink signal includes at least one of the following: a synchronization signal/physical broadcast channel block (SSB), a channel state information-reference signal (CSI-RS), or a demodulation reference signal (DMRS).

In some embodiments, the first resource set includes multiple resources, and these resources are used for downlink beam sweeping. For example, the multiple resources within the first resource set can be used to perform operation S210 in FIG. 2. In some embodiments, any resource in the multiple resources included in the first resource set includes multiple resource elements (RE).

As a sub-embodiment of the above embodiments, the downlink signal is transmitted via beam sweeping. For example, the second node may transmit multiple beams carrying downlink signals on the first resource set, i.e., downlink beam sweeping. The first node may receive these downlink transmission beams on the first resource set. The beams for transmitting the downlink signal may be some or all of the beams in the set B of beams.

In some embodiments, when the measurement results of the first resource set are used to predict future beams, the first resource set is used for the transmission of prior beams.

The first resource set may be located over multiple first-type time instances, meaning that the first resource set may include time domain resources corresponding to the multiple first-type time instances. By way of example, multiple first-type time instances may be used for transmitting downlink signal.

In some embodiments, the first resource set includes the multiple first-type time instances.

In some embodiments, the time domain resources occupied by the first resource set include the multiple first-type time instances.

In some embodiments, the beams used for downlink signal transmission over the multiple first-type time instances are beams from Set B.

In some embodiments, the first-type time instances may be time domain resources that meet certain conditions. For example, the first-type time instances may refer to multiple time units within a first time period before performing beam prediction. Alternatively, the first-type time instances may be the time units used for transmitting the predicted beams. These time units may be one or more time slots, or one or more symbols, which will be illustrated in conjunction with second-type time instances later. In some embodiments, the multiple first-type time instances are multiple time slots.

In some embodiments, in the context of time-domain beam management, multiple downlink beams are transmitted via the multiple time domain resources in the first resource set. The multiple time domain resources may include multiple partially continuous or fully continuous time instances. That is, the multiple first-type time instances are partially continuous or fully continuous in the time domain, allowing for timely collection of measurement results.

In some embodiments, the multiple first-type time instances are continuous in time.

In some embodiments, the multiple first-type time instances are discontinuous in the time domain. For example, the multiple first-type time instances are distributed at certain intervals in the time domain. Alternatively, the multiple first-type time instances are randomly distributed in the time domain.

In some embodiments, at least two adjacent first-type time instances in the multiple first-type time instances are discontinuous in time.

It should be understood that, in the embodiments of the present disclosure, the time instance may also be replaced by any time unit or time domain resource of any size. the time unit may be a time slot, a symbol, or any designated time period.

In some embodiments, the multiple resources in the first resource set may be determined based on second configuration signaling. That is, the first node may receive the second configuration signaling to determine the multiple resources in the first resource set. By way of example, the second configuration signaling may indicate multiple pieces of first-type beam information, and the multiple resources in the first resource set are associated with the multiple pieces of first-type beam information.

In some embodiments, the second configuration signaling includes multiple transmission configuration indicator (TCI) state configurations. The TCI state configurations are used to indicate multiple pieces of first-type beam information, thereby facilitating the determination of the measured multiple resources.

In some embodiments, the second configuration signaling includes at least one transmission configuration indicator (TCI). In some embodiments, the second configuration signaling includes at least one TCI state. In some embodiments, the second configuration signaling includes at least one TCI state identifier. In some embodiments, the second configuration signaling includes at least one downlink signal.

In some embodiments, the second configuration signaling includes at least one quality of service class identifier (QCL) type. In some embodiments, the second configuration signaling includes at least one downlink signal and a corresponding QCL type.

In some embodiments, the beam information of prior beams used for predicting multiple future beams may be referred to as first-type beam information. These prior beams are used by the first node to predict one or more beams corresponding to each of N second-type time instances. By way of example, the first node may determine the first resource set or multiple resources within the first resource set based on the multiple pieces of first-type beam information.

In some embodiments, the multiple pieces of first-type beam information come from Set B.

In some embodiments, the multiple pieces of first-type beam information correspond to a subset of Set B.

In some embodiments, the multiple pieces of first-type beam information is different from the multiple pieces of second-type beam information.

In some embodiments, the multiple pieces of first-type beam information is a subset of the multiple pieces of second-type beam information.

In some embodiments, the multiple pieces of first-type beam information is not a subset of the multiple pieces of second-type beam information.

In some embodiments, the multiple pieces of first-type beam information is identical to the multiple pieces of second-type beam information.

In some embodiments, the multiple pieces of first-type beam information is used to train the UE-side AI/ML model.

In some embodiments, any of the first-type beam information in the multiple pieces of first-type beam information may include one or more of the following: a beam identifier or beam index; channel state information-reference signal (CSI-RS) resource indication; synchronization signal/physical broadcast channel (SSB/PBCH) block resource indication; a transmission configuration indicator (TCI); a TCI state; a downlink TCI state (DL TCI state); an uplink TCI state (UL TCI state); or a TCI state identifier (TCI status ID).

In some embodiments, the first-type beam information may be a beam identity/identifier (beam ID) or beam index. In some embodiments, the first-type beam information may be a channel state information-reference signal resource indicator (CSI-RSRI, CRI). In some embodiments, the first-type beam information may be a synchronization signal/physical broadcast channel block resource indicator (SSBRI). In some embodiments, the CSI-RSRI and/or SSBRI in the first-type beam information may be used to indirectly indicate the downlink transmission beams used by the CSI-RS or SSB as input to train the AI/ML model. In some embodiments, the first-type beam information may be a transmission configuration indicator or information related to the transmission configuration indicator.

In some embodiments, at least two of the multiple pieces of first-type beam information are identical.

In some embodiments, any two of the multiple pieces of first-type beam information are different from each other.

In some embodiments, the multiple resources in the first resource set are respectively associated with the multiple pieces of first-type beam information. This may include that the multiple resources in the first resource set are respectively used for transmitting wireless signals using the multiple first-type beams corresponding to the multiple pieces of first-type beam information. By way of example, multiple measurement results on the first resource are collected and used either for training the first model during the model training phase, or for inferring the output of the first model during the model inference phase.

In some embodiments, the multiple beams used for transmitting wireless signals over the multiple resources in the first resource set respectively correspond to the multiple pieces of first-type beam information. In some embodiments, the multiple downlink transmission beams used over the multiple resources in the first resource set are in one-to-one correspondence with the multiple pieces of first-type beam information.

In some embodiments, the second configuration signaling may further indicate the multiple resources in the first resource set that are associated with the multiple pieces of first-type beam information. For example, the second configuration signaling may indicate the multiple beams corresponding to the multiple pieces of first-type beam information by providing information of the multiple resources in the first resource set. Alternatively, the second configuration signaling may indicate the multiple resources in the first resource set associated therewith by providing the multiple pieces of first-type beam information.

In some embodiments, the multiple first-type beam information may indicate the multiple resources in the first resource set, so that the first node can collect measurement results on the multiple resources in the first resource set for training purposes.

In some embodiments, the first node may receive the second configuration signaling by various ways. In an implementation, the first node may receive the second configuration signaling configured by a higher layer. For example, the first node may determine the second configuration signaling based on higher-layer configuration information. In another implementation, the first node may directly receive the second configuration signaling transmitted by the second node.

In some embodiments, the second configuration signaling is configured by a higher layer. In some embodiments, the second configuration signaling includes higher-layer signaling. In some embodiments, the second configuration signaling includes RRC layer signaling. In some embodiments, the second configuration signaling includes MAC layer signaling.

In some embodiments, when the reception manner of the second configuration signaling is the same as that of the first configuration signaling, the first configuration signaling and the second configuration signaling may be of the same type, or may be of different types.

In some embodiments, the first configuration signaling and the second configuration signaling belong to the same signaling. By way of example, the first configuration signaling and the second configuration signaling belong to the same higher-layer signaling. For example, the first configuration signaling and the second configuration signaling belong to the same RRC layer signaling.

In some embodiments, the first configuration signaling is significantly different from the second configuration signaling. By way of example, the first configuration signaling and the second configuration signaling belong to two different higher-layer signaling messages. By way of example, the first configuration signaling and the second configuration signaling belong to two different RRC layer signaling messages. By way of example, the first configuration signaling and the second configuration signaling belong to two different MAC layer signaling messages. By way of example, the first configuration signaling belongs to RRC layer signaling, and the second configuration signaling belongs to MAC layer signaling. By way of example, the first configuration signaling belongs to MAC layer signaling, and the second configuration signaling belongs to RRC layer signaling.

In S520, the first node performs measurement on the first resource set.

Performing measurement on the first resource set includes performing measurement on a part or all of the resources in the first resource set. In other words, when performing measurement on the first resource set, the first node may perform measurement on any one, any subset, or all of the resources in the first resource set.

In some embodiments, when the multiple resources in the first resource set are used for transmitting downlink signals, performing measurement on the first resource set includes performing measurement on the downlink signals carried on the multiple resources.

In some embodiments, the measurement result for the first resource set includes measurement results for the multiple resources in the first resource set. In some embodiments, the measurement result for the first resource set includes measurement results for the downlink signals. In some embodiments, the measurement result for the first resource set includes measurement results for the downlink signals transmitted over the multiple resources.

In some embodiments, the multiple first-type time instances are located within a measurement window. That is, the multiple first-type time instances are located within the measurement window for beam prediction, so as to facilitate collection of measurement results.

In some embodiments, the measurement result for the first resource set may include multiple parameters that represent the signal quality. For example, the measurement results may include one or more of RSRP, reference signal received quality (RSRQ), signal to interference plus noise ratio (SINR), received signal strength indication (RSSI), or other similar values, without limitation. In some embodiments, the measurement result for the first resource set include the RSRP value.

In some embodiments, the measurement result for the first resource set may include measurement results from different layers. The measurement results from different layers may be a Layer 1 measurement result or Layer 3 (L3) measurement result. In some embodiments, the measurement result for the first resource set include the L1-RSRP value. In some embodiments, the measurement result for the first resource set include the L3-RSRP value.

In some embodiments, the measurement result for the first resource set may be used to predict the beams follows the time domain resources corresponding to the first resource set. For example, when the multiple resources in the first resource set are used for downlink transmission beams, the measurement results for these downlink transmission beams may be used by the first node or other node to predict future downlink transmission beams.

In some embodiments, when the multiple resources in the first resource set are used to transmit beams in Set B of beams, the measurement result may include current measurement results or historical measurement results of the Set B of beams. When the measurement results are current measurement results, the time domain resources included in the first resource set are adjacent to or relatively close to the time domain resources where the predicted beams are located. When the measurement results are historical measurement results, the first resource set may include a relatively large number of time domain resources spanning a longer time duration.

In some embodiments, the measurement result for the first resource set includes measurement results for downlink signals transmitted using multiple first-type beams over multiple first-type time instances. In some embodiments, the measurement result for the first resource set includes measurement results for downlink signals transmitted using multiple first-type beams over the multiple resources included in the first resource set.

In some embodiments, the measurement result for the first resource set includes measurement results for downlink signals transmitted using beams in Set B of beams over the multiple first-type time instances. In some embodiments, the measurement result for the first resource set includes measurement results for downlink signals transmitted using beams in Set B of beams over the multiple resources included in the first resource set.

In some embodiments, the measurement result for the first resource set includes measurement results for multiple downlink signals transmitted over multiple first-type time instances, where the multiple downlink signals are transmitted using multiple first-type beams, respectively.

In some embodiments, the measurement result for the first resource set includes measurement results for multiple downlink signals transmitted over the multiple resources included in the first resource set, where the multiple downlink signals are transmitted using multiple beams in Set B of beams, respectively.

In some embodiments, historical measurement results based on Set B of beams are used to predict downlink beams in a Set A.

In some embodiments, the first node may predict future beams using a first model. The first model may be an AI/ML model.

In some embodiments, the first model is used to determine the multiple pieces of second-type beam information. By way of example, the measurement result for the first resource set is used by the first model to determine the multiple pieces second-type beam information.

In some embodiments, the measurement result for the first resource set serves as input to the first model.

In some embodiments, the measurement result for the first resource set corresponds to the multiple first-type beams.

In some embodiments, the measurement result for the first resource set corresponds to the Set B of beams.

In some embodiments, measurements based on the multiple first-type beams serve as input to the first model.

In some embodiments, measurement results based on the multiple first-type beams serve as input to the first model.

In some embodiments, measurements based on the Set B of beams serve as input to the first model.

In some embodiments, measurement results based on the Set B of beams serve as input to the first model.

In some embodiments, the output of the first model includes the multiple pieces of second-type beam information.

In some embodiments, the output of the first model includes beam information in a Set A of beams.

In some embodiments, the output of the first model includes predicted RSRP values of the plurality of second-type beams.

In some embodiments, the output of the first model includes predicted RSRP values of the plurality of second-type beams.

In some embodiments, the output of the first model includes a plurality of L1-RSRP values of the plurality of predicted second-type beams.

In some embodiments, the output of the first model includes a plurality of L1-RSRP predicted values of the plurality of second-type beams.

In some embodiments, the plurality pieces of second-type beam information serve as the output of the first model.

In some embodiments, the plurality of RSRP values of the plurality of second-type beams serve as the output of the first model.

In some embodiments, the first model includes an AI model. In some embodiments, the first model is an AI model.

In some embodiments, the first model includes an ML model. In some embodiments, the first model is an ML model.

In some embodiments, the first model includes an AI/ML model. In some embodiments, the first model is an AI/ML model.

In some embodiments, the first model is located at the first node. In some embodiments, the first model is located at the UE. In some embodiments, the first model includes a UE-side model. In some embodiments, the first model is a UE-side model. In some embodiments, the first model includes a UE-side AI/ML model. In some embodiments, the first model is a UE-side AI/ML model.

In some embodiments, the first model is located at the second node. In some embodiments, the first model is located at the base station/gNB/network side. In some embodiments, the first model includes a network-side model (NW-side model). In some embodiments, the first model is a network-side model. In some embodiments, the first model includes a network-side AI/ML model (NW-side AI/ML model). In some embodiments, the first model is a network-side AI/ML model.

In some embodiments, the first model may be equivalent to at least one of a first entity, a first functionality, a first AI/ML model, and a first AI/ML functionality.

In some embodiments, the first model is used for inference. In some embodiments, the first model is used for the inference operation in beam management. In some embodiments, the first model is used for beam prediction.

In some embodiments, the first model is used to determine the plurality pieces of second-type beam information. In some embodiments, the first model is used to determine the plurality pieces of second-type beam information and the plurality of RSRP values of the plurality pieces of second-type beams. In some embodiments, the measurement result for the first resource set is used by the first model to determine the plurality pieces of second-type beam information.

In some embodiments, the first model includes at least one of supervised learning, unsupervised learning, self-supervised learning, reinforcement learning, and federated learning.

In some embodiments, the first model includes a generative model. In some embodiments, the first model includes a neural network (NN). In some embodiments, the first model includes at least one of a feedforward neural network (FNN), a convolutional neural network (CNN), a recurrent neural network (RNN), a long short-term memory (LSTM) network, a self-attention mechanism, and a Transformer model.

In some embodiments, the first model includes forward propagation, loss function calculation, and back propagation.

In some embodiments, the first node may predict beams using an AI/ML model. As described above, the AI/ML model may be a UE-side (terminal device-side) AI/ML model, a network-side AI/ML model, or a dual-side model, without limitation.

In some embodiments, when the first node is the UE, the UE-side AI/ML model may be deployed on the UE or on a UE-related device.

In some embodiments, in time domain beam management, the UE-side AI/ML model may predict the RSRP of future beams based on L1-RSRP measurement values of beams in the Set B of beams over the previous T1 time instances.

In some embodiments, the plurality pieces of first-type beam information as input to the first model may include a plurality of first-type beams and their measurement values. The plurality pieces of second-type beam information as output from the first model may include a plurality of second-type beams and their predicted values. The plurality of first-type beams and the plurality of second-type beams may be the same or different, and exemplary illustrations will be provided with reference to FIG. 6 and FIG. 7.

In some embodiments, the plurality of first-type beams is used for the first resource set. In some embodiments, signals transmitted on the first resource set use the plurality of first-type beams. In some embodiments, the plurality of first-type beams belongs to the Set B of beams. In some embodiments, the plurality of first-type beams is the Set B of beams. In some embodiments, the plurality of first-type beams is a subset of the Set B of beams. In some embodiments, the Set B of beams includes a plurality of beams, and any first-type beam in the plurality of first-type beams is one of the beams in the Set B of beams.

In some embodiments, the plurality of second-type beams belongs to the Set A of beams. In some embodiments, the plurality of second-type beams is the Set A of beams. In some embodiments, the plurality of second-type beams is a subset of the Set A of beams. In some embodiments, the Set A of beams includes a plurality of beams, and any second-type beam in the plurality of second-type beams is one of the beams in the Set A of beams.

In some embodiments, the beam set B is the beam set used for measurement. In some embodiments, the Set A of beams is the beam set to be predicted. In some embodiments, the plurality of first-type beams are the beams being measured. In some embodiments, the plurality of second-type beams are the beams being predicted.

In S530, the first node sends the first information. By way of example, the first node may send the first information to the second node.

In an example, the first node is the UE, and the first node may report the first information to the base station or gNB.

In some embodiments, the first information may include one or more of the following: a MAC control element (MAC CE), uplink control information (UCI), downlink control information (DCI), or an RRC information element (RRC IE).

In some embodiments, the first information may be a MAC CE, a DCI, an RRC IE, or a combination of at least two of the three types of signaling. In some embodiments, the first information may be a piece of L1 information, for example, UCI. In some embodiments, the first information includes at least one MAC CE.

In some embodiments, the first information may be configured or instructed by a higher layer. By way of example, the first node may send the first information to the second node based on higher layer signaling. In some embodiments, the first information is configured by higher layer signaling. In some embodiments, the first information belongs to higher layer signaling. In some embodiments, the first information belongs to RRC layer signaling. In some embodiments, the first information belongs to MAC layer signaling.

The first information may indicate N second-type time instances, where N is a positive integer. In time domain beam management, the N second-type time instances may be N future time instances. In some embodiments, the N second-type time instances may be N time units. The time unit may be one or more time slots, or may be one or more symbols, without limitation in this regard.

In some embodiments, the N second-type time instances are respectively N time slots.

In some embodiments, under scenarios involving time domain beam management, the N second-type time instances may be N consecutive time units or N non-consecutive time units, in order to meet actual requirements of different application scenarios.

In some embodiments, the N second-type time instances are consecutive in time. In another embodiment, at least two adjacent second-type time instances among the N second-type time instances are non-consecutive in time.

In some embodiments, the N second-type time instances are located within a prediction window. That is, the N second-type time instances are within the prediction window for beam prediction, so as to facilitate the determination of transmission resources for the predicted future beams.

In some embodiments, the positions of the N second-type time instances in the time domain are later than the positions of the plurality of first-type time instances in the time domain, in order to collect measurement results of the plurality of first-type time instances and to perform prediction for the beams of the N second-type time instances. That is, the plurality of first-type time instances are earlier than the N second-type time instances.

In some embodiments, the plurality of first-type time instances being earlier than the N second-type time instances is one or more of the following: at least one of the plurality of first-type time instances being earlier than any of the N second-type time instances, the first first-type time instance among the plurality of first-type time instances being earlier than the first second-type time instance among the N second-type time instances, the last first-type time instance among the plurality of first-type time instances being earlier than the last second-type time instance among the N second-type time instances, the last first-type time instance among the plurality of first-type time instances being earlier than the first second-type time instance among the N second-type time instances, any of the plurality of first-type time instances being earlier than the first second-type time instance among the N second-type time instances, and none of the N second-type time instances being earlier than the last first-type time instance among the plurality of first-type time instances. Exemplarily, the N second-type time instances are later than any of the plurality of first-type time instances, so that the beam information of the second-type time instances can be predicted based on the beam information of the plurality of first-type time instances.

In some embodiments, the earliest time instance among the plurality of first-type time instances is earlier than the earliest time instance among the N second-type time instances, and the latest time instance among the plurality of first-type time instances is later than the earliest time instance among the N second-type time instances. In other words, the plurality of first-type time instances and the N second-type time instances overlap in the time domain. The beam information corresponding to time instances in the overlap is predicted based on the measurement results for the first-type time instances that do not overlap the N second-type time instances.

In some embodiments, the time instance includes at least one time slot. In another embodiment, the time instance includes a plurality of time slots. In some embodiments, the time instance includes at least one symbol. In another embodiment, the time instance includes a plurality of symbols.

In some embodiments, any of the plurality of first-type time instances includes at least one symbol.

In some embodiments, any of the plurality of first-type time instances includes at least one time slot.

In some embodiments, any of the N second-type time instances includes at least one symbol.

In some embodiments, any of the N second-type time instances includes at least one time slot.

In some embodiments, any of the plurality of first-type time instances includes at least one symbol, and any of the N second-type time instances includes at least one time slot.

In some embodiments, any of the plurality of first-type time instances includes at least one time slot, and any of the N second-type time instances includes at least one symbol.

In some embodiments, any of the plurality of first-type time instances includes at least one symbol, and any of the N second-type time instances includes at least one symbol.

In some embodiments, any of the plurality of first-type time instances includes at least one time slot, and any of the N second-type time instances includes at least one time slot.

In some embodiments, the symbol includes an orthogonal frequency division multiplex (OFDM) symbol. In some embodiments, the symbol includes a single-carrier frequency-division multiple access (SC-FDMA) symbol. In some embodiments, the symbol includes a discrete Fourier transform-spread-OFDM (DFT-s-OFDM) symbol.

The first information is also used to indicate the multiple pieces of second-type beam information corresponding to N second-type time instances. In some embodiments, the first information, which includes the multiple pieces of second-type beam information, is referred to as inference result report information. For instance, in time domain beam management, the UE-side AI/ML model can predict the RSRP values for the future N second-type time instances based on beam set A (e.g., M beams), using the L1-RSRP measurement values from the beams in the beam set B over the preceding T1 time instances. The top-$K_i$ beams for the N second-type time instances can be inferred based on these predicted RSRP values, and the inference result report information is then reported.

The measurement result for the first resource set is used to determine the multiple pieces of second-type beam information, which refers to the beam information of future beams predicted based on the measurement results from the first resource set. The beam information of these future beams is referred to as second-type beam information. As mentioned earlier, the first model can determine the multiple pieces of second-type beam information based on the measurement results of multiple first-type beams.

In some embodiments, any piece of the second-type beam information among the multiple pieces of second-type beam information may be one or more of the following: a beam identifier or beam index, channel state information-reference signal resource indication, synchronization signal/physical broadcast channel block resource indication, transmission configuration indication, a transmission configuration indication status, a downlink transmission configuration indication status, an uplink transmission configuration indication status, and a transmission configuration indication status identifier.

In some embodiments, any piece of the second-type beam information may be a beam identifier/beam index. In some embodiments, any piece of the second-type beam information may be a CSI-RS resource indication (CRI). In some embodiments, any piece of the second-type beam information may be a synchronization signal/physical broadcast channel block resource indication (SSBRI). In some embodiments, the CSI-RSRI/SSBRI may be used to indirectly indicate the downlink transmission beam used for CSI-RS/SSB during the AI/ML model training phase. In some embodiments, any piece of the second-type beam information may be transmission configuration indication (TCI).

In some embodiments, at least two pieces of the beam information in the multiple pieces of second-type beam information are identical.

In some embodiments, any two pieces of beam information in the multiple pieces of second-type beam information are different from each other.

In some embodiments, the multiple pieces of second-type beam information in the first information may include predicted signal quality. That is, in addition to indicating the multiple pieces of second-type beam information, the first information may also indicate the RSRP values predicted by the UE-side AI/ML model for the beams on the N second-type time instances, enabling the second node to determine the transmission beams for the N second-type time instances.

It should be understood that, in the embodiments of the present disclosure, the beam information may also be replaced by beams. For example, the multiple pieces of first-type beam information associated with multiple resources in the first resource set may be replaced by multiple first-type beams associated with the resources. Similarly, the multiple pieces of second-type beam information corresponding to N second-type time instances may be replaced by multiple second-type beams corresponding to the N second-type time instances.

Figure 6:
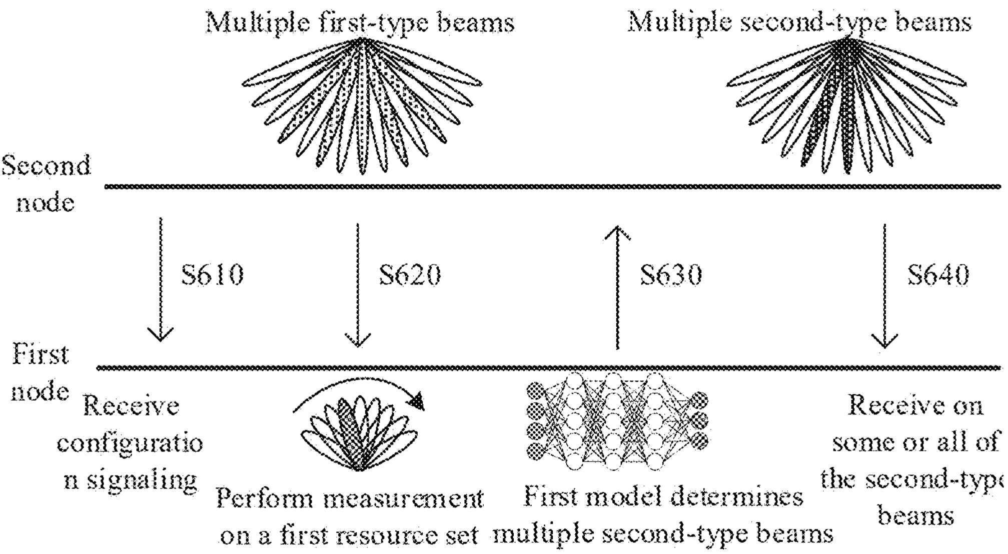
FIG. 6 is a schematic flow chart of a possible implementation of the method shown in FIG. 5.
Figure 7:
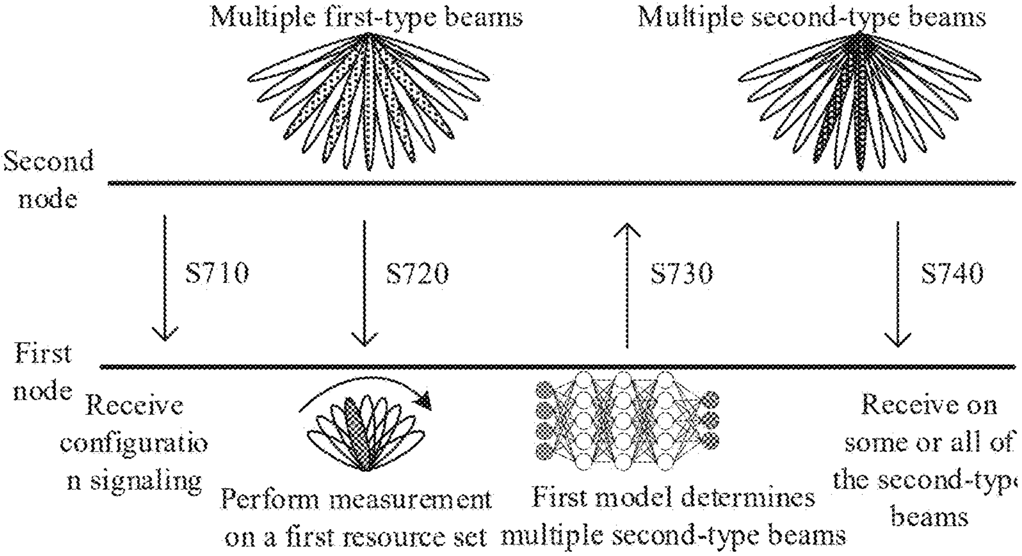
FIG. 7 is a schematic flow chart of another possible implementation of the method shown in FIG. 5.

For ease of understanding, the relationship between the first-type beams and second-type beams will be illustratively explained below with reference to the flow charts in FIG. 6 and FIG. 7. Both FIG. 6 and FIG. 7 are presented from the perspective of the interaction between the first node and the second node. The first node may be, for example, a UE, and the second node may be, for example, a gNB. Here, the first model is deployed on the first node side, i.e., the UE-side model. By comparing FIG. 6 and FIG. 7, it can be seen that the multiple first-type beams in FIG. 6 are narrow beams, while the multiple first-type beams in FIG. 7 are wide beams.

Referring to FIG. 6, in S610, the first node receives configuration signaling and determines multiple first-type beams based on the configuration signaling. This configuration signaling may be at least one of the first configuration signaling and second configuration signaling mentioned earlier. The first configuration signaling may indicate the first resource set.

In S620, the first node performs measurements on the first resource set. For example, the first node may use a fixed beam or an optimal beam to measure the multiple first-type beams on the first resource set.

In S630, after the measurement result for the first resource set is used by the first model to determine multiple second-type beams, the first node sends the first information to the second node. The first information may include multiple pieces of second-type beam information.

In S640, the first node performs reception on some or all of the multiple second-type beams. The reception performed by the first node may either be a measurement or signal detection. As shown in FIG. 6, the multiple second-type beams are narrow beams. When the multiple first-type beams are from Set B and the multiple second-type beams are from Set A, Set B may be the same as Set A or may be a subset of Set A.

Referring to FIGS. 7, S710 to S740 are the same as S610 to S640 in FIG. 6, and will not be repeated here. The difference from FIG. 6 is that in FIG. 7, the multiple first-type beams are wide beams, while the multiple second-type beams are narrow beams. In other words, when the multiple first-type beams are from Set B and the multiple second-type beams are from Set A, Set B and Set A are different.

From FIG. 6 and FIG. 7, it can be seen that when the first node predicts multiple second-type beams based on the measurement results of multiple first-type beams, the multiple second-type beams may be the same as or different from the multiple first-type beams.

In some embodiments, the multiple pieces of second-type beam information correspond to N second-type time instances. For example, the N second-type time instances correspond to N sets of beam information, and the multiple pieces of second-type beam information are within these N sets of beam information. The N sets of beam information may also be referred to as N groups of beam information.

In some embodiments, the N sets of beam information correspond one-to-one with the N second-type time instances. The N second-type time instances correspond to the multiple pieces of second-type beam information through the N sets of beam information. For example, one piece of or more pieces of second-type beam information in the beam information set X correspond to the second-type time instance X that is associated with beam information set X.

In some embodiments, the N sets of beam information include the multiple pieces of second-type beam information. In some embodiments, the N sets of beam information are the same as the multiple pieces of second-type beam information. In some embodiments, any piece of second-type beam information in the multiple pieces of second-type beam information is one piece of beam information in the N sets of beam information.

In some embodiments, the multiple pieces of second-type beam information corresponding to the N second-type time instances include one second-type beam information from each beam information set. Such second-type beam information is the information of the beam with the strongest signal quality in the respective beam information set.

In some embodiments, the multiple pieces of second-type beam information corresponding to the N second-type time instances includes multiple pieces of second-type beam information from each beam information set. These multiple pieces of second-type beam information represent the information of the beams with the strongest signal quality in the respective beam information set.

In some embodiments, the multiple pieces of second-type beam information corresponding to the N second-type time instances includes one piece of or more pieces of second-type beam information from each beam information set. Such one piece of or more piece of second-type beam information represent the information of the beams, whose signal quality exceeds a specified threshold, in the respective beam information set.

In some embodiments, the N second-type time instances include a first time instance, and the first beam information set is the beam information set corresponding to the first time instance within the N sets of beam information. The first time instance corresponds to L beams. The first beam information set includes the beam information of one or more of the strongest beams from the L beams at the first time instance, where L is greater than 1.

In some embodiments, the first time instance is any of the N second-type time instances.

In some embodiments, the L beams are all from the beam set A.

In some embodiments, the L beams are a subset of the beam set A.

In some embodiments, any beam in the L beams is from beam set A.

In some embodiments, the multiple second-type beams are from the L beams.

In some embodiments, the multiple second-type beams are a subset of the L beams.

In some embodiments, any second-type beam in the multiple second-type beams is from the L beams.

In some embodiments, the L beams are all the beams or a portion of the beams used at the first time instance.

In some embodiments, the value of L in the L beams may be equal to the value of M shown in FIG. 4.

In some embodiments, the first time instance corresponding to L beams means that the resources corresponding to the first time instance may be used to transmit all or part of the L beams.

In some embodiments, the first time instance is any one of the N second-type time instances. That is, each time instance in the N second-type time instances may correspond to L beams.

In some embodiments, the one or more strongest beams indicated by the first beam information set are one or more beams with the strongest signal quality among the L beams. In some embodiments, the one or more strongest beams indicated by the first beam information set are one or more beams with the highest RSRP value among the L beams. In some embodiments, the one or more strongest beams indicated by the first beam information set are the beams with the highest L1-RSRP value among the L beams.

In some embodiments, the signal quality includes the RSRP value. In some embodiments, the signal quality includes the L1-RSRP value. In some embodiments, the signal quality includes the L3-RSRP value.

In some embodiments, the one or more strongest beams are the K beams with the strongest signal quality among the L beams at the first time instance, where K is greater than or equal to 1. For example, each time instance in the N second-type time instances corresponds to the K beams with the strongest signal quality. In case of K=1, only the strongest beam is reported for each time instance.

In some embodiments, when K is a given value, the K beams with the strongest signal quality are reported for each time instance. For example, when K is a given value, only the beam information corresponding to the top K predicted RSRPs is reported for each time instance.

In some embodiments, when K is a maximum value, the number of beams with the strongest signal quality reported for each time instance does not exceed K.

In some embodiments, the one or more strongest beams are those among the K beams with the highest signal quality, out of the L beams at the first time instance, whose signal quality exceeds a first threshold. In this scenario, K serves as a maximum value. For example, among the top K predicted RSRPs for each time instance, only the beam information corresponding to the RSRP(s) greater than the first threshold is reported.

In some embodiments, the one or more strongest beams are the K beams, among the L beams at the first time instance, whose signal quality exceeds a first threshold. In this case, when the first threshold is constant, K is a dynamic parameter. For example, if only one beam among the L beams has signal quality greater than the first threshold, then K equals 1. In another example, if three beams among the L beams have signal quality greater than the first threshold, then K equals 3.

In some embodiments, the first threshold is preconfigured, predefined, configured by a network, or configured by higher-layer signaling.

In some embodiments, the first threshold may be dynamically configured. For example, when the strongest beams are the K beams, among the L beams, whose signal quality is greater than the first threshold, the first threshold may be decreased if none of the L beams has a signal quality greater than the first threshold.

In some embodiments, K is constant, or K is configured.

In some embodiments, the number of one or more strongest beams corresponding to different time instances may be equal or may be different. For example, when the i-th second-type time instance among the N second-type time instances corresponds to $K_i$ strongest beams, the values of Ki may be equal or may be different.

In some embodiments, the i-th beam information set among the N beam information sets may include beam information of $K_i$ strongest beams among L beams in the i-th second-type time instance among the N second-type time instances, where 1≤i≤N and Ki≥1. At least two of the N beam information sets are different, or the values of $K_i$ corresponding to at least two of the N beam information sets are different.

In some embodiments, at least two of the N beam information sets correspond to different $K_i$ strongest beams, respectively.

In some embodiments, the $K_i$ strongest beams are the $K_i$ beams having the highest signal quality among the L beams in the i-th second-type time instance among the N second-type time instances.

In some embodiments, the $K_i$ strongest beams are beams, whose signal quality is greater than the first threshold, among the $K_i$ beams having the highest signal quality among the L beams at the i-th second-type time instance among the N second-type time instances.

In some embodiments, the Ki strongest beams are the $K_i$ beams, whose signal quality is greater than the first threshold, among the L beams in the i-th second-type time instance among the N second-type time instances.

In some embodiments, if the values of $K_i$ are equal across different time instances, i.e., Ki=K, then the number of resources or bits occupied by the reported beam information for each time instance are equal. For example, if $K_i$=1, only the strongest beam is reported for each time instance.

In some embodiments, each Top-$K_i$ beam information includes $K_i$ beam information items. Each of the Ki beam information items indicates a beam in Set A.

The foregoing description in conjunction with FIG. 5 to FIG. 7 illustrates how the first node determines multiple pieces of second-type beam information items on N second-type time instances based on the measurement result for a first resource set. The multiple pieces of second-type beam information items indicated by the first information correspond to a subset of all beams associated with the N second-type time instances. When the first node transmits the N second-type time instances and the multiple pieces of second-type beam information items via the first information, the reporting of prediction results can be achieved with reduced resource overhead.

In some embodiments, the first information may indicate the N second-type time instances and the plurality of beam information items in various ways. By way of example, inference results of an AI/ML model at the UE side may be reported in multiple manners to convey the N second-type time instances and the corresponding Top-$K_i$ beams. Several embodiments are described below to illustrate this in detail.

First Embodiment

The first information may include N beam information sets and N second-type time instances, where the N second-type time instances correspond one-to-one with the N beam information sets. For example, the first information may include N second-type time instances and N beam information sets.

In some embodiments, each beam information set among the N beam information sets may include $K_i$ beam information items.

As described earlier, the first information may be carried in various signaling types. Below, an example using MAC CE is provided. When multiple beam information items are indicated by N beam information sets corresponding to N second-type time instances, the first information includes at least one MAC CE.

In some embodiments, the first information includes a MAC CE, and the MAC CE includes multiple fields, one of which indicates a beam information set from the N beam information sets.

In some embodiments, the first information includes a MAC CE, and the MAC CE includes multiple fields, one of which indicates a second-type time instance from the N second-type time instances.

In some embodiments, the first information includes a MAC CE, and the MAC CE includes multiple fields, one of which indicates a second-type time instance from the N second-type time instances and a corresponding beam information set from the N beam information sets.

In some embodiments, the first information includes a MAC CE, and the MAC CE includes multiple fields, one of which indicates a second-type time instance from the N second-type time instances, while another field indicates a corresponding beam information set from the N beam information sets.

In some embodiments, the first information includes multiple MAC CEs, and any MAC CE among the multiple MAC CEs indicates a beam information set from the N beam information sets.

In some embodiments, the first information includes multiple MAC CEs, and any MAC CE among the multiple MAC CEs indicates a second-type time instance from the N second-type time instances.

In some embodiments, the first information includes multiple MAC CEs, and any MAC CE among the multiple MAC CEs indicates a beam information set from the N beam information sets and a second-type time instance from the N second-type time instances.

In some embodiments, the first information includes multiple MAC CEs, and any MAC CE among the multiple MAC CEs includes an identifier of a beam information set from the N beam information sets.

In some embodiments, the first information includes multiple MAC CEs, and any MAC CE among the multiple MAC CEs includes an index of a second-type time instance from the N second-type time instances.

In some embodiments, the first information includes multiple MAC CEs, and any MAC CE among the multiple MAC CEs includes an identifier of a beam information set from the N beam information sets and an index of a second-type time instance from the N second-type time instances.

In some embodiments, each second-type time instance may also be a resource indicator. The resource indicators of the N second-type time instances are the time slot indices of the N second-type time instances, and/or the indices of the N second-type time instances in all the time slots of the prediction window. For example, when the prediction window is configured, a time instance i may be the index of the corresponding time slot among all the time slots included in the prediction window.

In some embodiments, the beam information in the first information may also include a TCI to indicate the transmission configuration of the N second-type time instances. In some embodiments, the first information includes at least one time instance and at least one TCI state ID.

In some embodiments, the first information includes N second-type time instances and N TCI state IDs, where the N TCI state IDs correspond to the N second-type time instances, respectively. In some embodiments, the first information includes N second-type time instances and N beam indices, where the N beam indices correspond to the N second-type time instances, respectively. In some embodiments, the first information includes N second-type time instances and N beam set indices, where the N beam set indices correspond to the N second-type time instances, respectively.

To facilitate understanding, an exemplary method in which the first information includes N second-type time instances and N beam information sets/TCI state IDs is described below in conjunction with FIG. 8 and FIG. 9. The inference result report in FIG. 8 is the first information.

Figure 8:
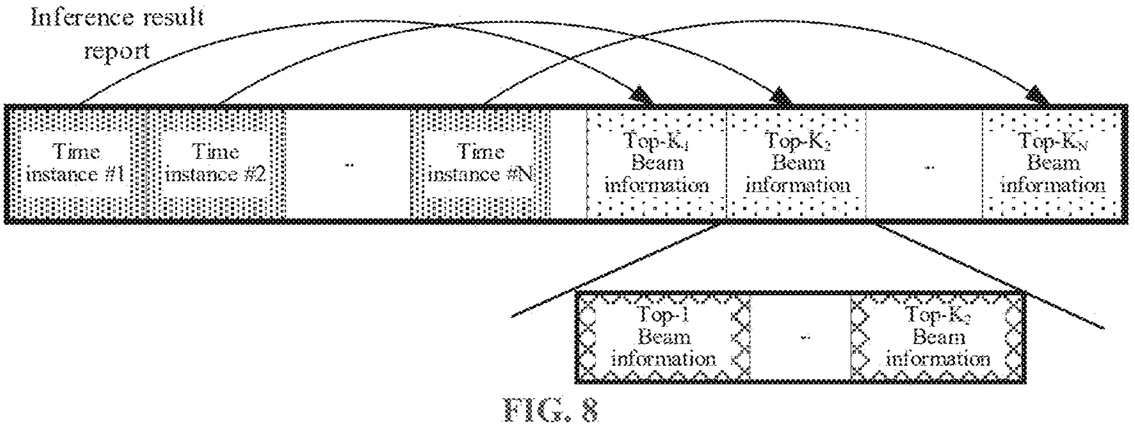
FIG. 8 is a schematic structural diagram of a possible implementation of the first information.

Referring to FIG. 8, the first information includes two types of fields arranged in sequence. The first type of fields sequentially indicates the N second-type time instances, namely, a time instance #1 to a time instance #N. The second type of fields follows the first type of fields. The second type of fields sequentially indicates the N beam information sets corresponding one-to-one with the N second-type time instances, namely, a beam information set 1 to a beam information set N.

As shown in FIG. 8, each beam information set in the second-type fields includes Top-$K_i$ beam information (beam info.). That is, the beam information set 1 corresponding to the time instance #1 includes Top-$K_1$ beam information items, and the beam information set N corresponding to the time instance #N includes Top-$K_N$ beam information items. Taking the beam information set 2 corresponding to the time instance #2 as an example, the field containing the beam information set 2 may indicate the Top-$K_2$ beam information items, which include a Top-1 beam information item, a Top-2 beam information item, . . . , and a Top-$K_2$ beam information item.

Figure 9:
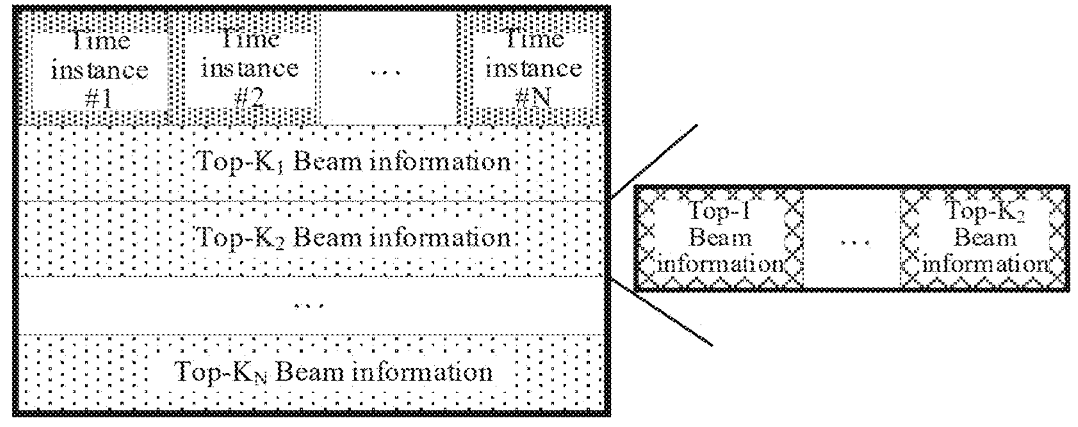
FIG. 9 is a schematic structural diagram of another possible implementation of the first information.

Referring to FIG. 9, the first information includes two types of fields arranged in parallel. The first type of fields sequentially indicates the N second-type time instances, namely, a time instance #1 to a time instance #N. The second type of fields concurrently indicates the N beam information sets corresponding one-to-one with the N second-type time instances, namely, a beam information set 1 to a beam information set N. The contents of each beam information set are the same as those in FIG. 8 and will not be repeated here.

The above description, in conjunction with FIG. 8 and FIG. 9, illustrates the method for reporting first information that includes N second-type time instances and N beam information sets. In this embodiment, the reported first information is relatively rich and can be flexibly indicated.

Second Embodiment

To reduce signaling overhead, multiple resource sets may be configured by higher-layer signaling. Each resource set may indicate a collection of time instances. For example, one resource set among the multiple resource sets may indicate N second-type time instances. In this scenario, the first information no longer needs to indicate the N second-type time instances directly but instead through the resource set.

In some embodiments, the first information may include a resource set identifier and N beam information sets. Each beam information set may include Top-$K_i$ beam information items. The N sets of Top-$K_i$ beam information correspond one-to-one with the N time instances associated with a resource set. Other technical features in the second embodiment may be similar to those in the first embodiment.

In some embodiments, multiple resource sets correspond to multiple collections of time instances. The N second-type time instances may be one of the multiple collections of time instance, and the resource set where the N second-type time instances are located may be referred to as the second resource set.

In some embodiments, the first information indicates the second resource set and the multiple pieces of second-type beam information items, where the second resource set is at the N second-type time instances. That is, the first information may indicate the N second-type time instances through the second resource set.

In some embodiments, the second resource set includes the N second-type time instances.

In some embodiments, the time domain resources occupied by the second resource set include the N second-type time instances.

In some embodiments, the second resource set includes multiple resources, and the multiple resources included in the second resource set are used for downlink signal transmission.

In some embodiments, any resource among the multiple resources included in the second resource set includes multiple resource elements.

In some embodiments, the first information may include an identifier of the second resource set to determine the N second-type time instances. By way of example, the identifier of the second resource set may be used by the second node to determine the N second-type time instances. In some embodiments, the first information may include an identifier of the second resource set corresponding to the N second-type time instances. The identifier of the second resource set may be referred to as a second resource set identifier (resource set ID), which indicates the second resource set corresponding to the N second-type time instances.

In some embodiments, the first information may include N beam information sets and an identifier of the second resource set. The identifier of the second resource set indicates the N second-type time instances. It can thus be seen that the N second-type time instances belong to any one of the multiple resource sets.

In some embodiments, the multiple resource sets to which the second resource set belongs may be indicated through a second resource set list, so that the first node can indicate the second resource set based on the second resource set list, and the second node can determine the N second-type time instances based on the first information.

In some embodiments, the second resource set list includes multiple resource sets, and the second resource set is one of the resource sets in the second resource set list.

In some embodiments, the identifier of the second resource set is used to identify the second resource set from the second resource set list.

In some embodiments, the identifier of the second resource set is an index of the second resource set among the multiple resource sets included in the second resource set list. By way of example, the first information may include the index of the second resource set in the second resource set list.

In some embodiments, the first resource set list includes multiple resource sets, and the first resource set is one of the resource sets in the first resource set list.

In some embodiments, the identifier of the first resource set is used to identify the first resource set from the first resource set list.

In some embodiments, the identifier of the first resource set is an index of the first resource set among the multiple resource sets included in the first resource set list. By way of example, the first configuration signaling may include the index of the first resource set in the first resource set list.

In some embodiments, the second resource set list is configured by higher-layer signaling. By way of example, the second resource set list is configured by RRC layer signaling. By way of example, the second resource set list is configured by MAC layer signaling. By way of example, the second resource set list is configured by an RRC IE. By way of example, the second resource set list is configured by a MAC CE.

In some embodiments, the second resource set list is configured by the network or the gNB.

In some embodiments, the first resource set list is configured by higher-layer signaling. By way of example, the first resource set list is configured by RRC layer signaling. By way of example, the first resource set list is configured by MAC layer signaling. By way of example, the first resource set list is configured by an RRC IE. By way of example, the first resource set list is configured by a MAC CE.

In some embodiments, the first resource set list is configured by the network or the gNB.

In some embodiments, the first resource set list and the second resource set list are associated with each other, or the two resource set lists correspond to each other. In some embodiments, the first resource set list is the same as the second resource set list. In some embodiments, the first resource set list is the second resource set list. In some embodiments, the first resource set list is different from the second resource set list.

In some embodiments, the plurality of second-type beam information items refers to the N beam information sets, where any beam information set among the N beam information sets is beam information of $K_j$ strongest beams among L beams at the j-th second-type time instance among the N second-type time instances, where $1 \leq j \leq N$ and $K_j \geq 1$.

In some embodiments, the $K_j$ strongest beams are the $K_j$ beams having the highest signal quality among the L beams at the j-th second-type time instance among the N second-type time instances.

In some embodiments, the $K_j$ strongest beams are the beams, whose signal quality is greater than a first threshold, among the $K_j$ beams having the highest signal quality among the L beams at the j-th second-type time instance among the N second-type time instances.

In some embodiments, the $K_j$ strongest beams are the $K_j$ beams, whose signal quality is greater than a first threshold, among the L beams at the j-th second-type time instance among the N second-type time instances.

In some embodiments, the L beams at the i-th second-type time instance are the same as, or different from, the L beams at the j-th second-type time instance.

To facilitate understanding, an exemplary method in which the first information includes an identifier of the second resource set is described below in conjunction with FIG. 10.

Figures 10, 11, 12:
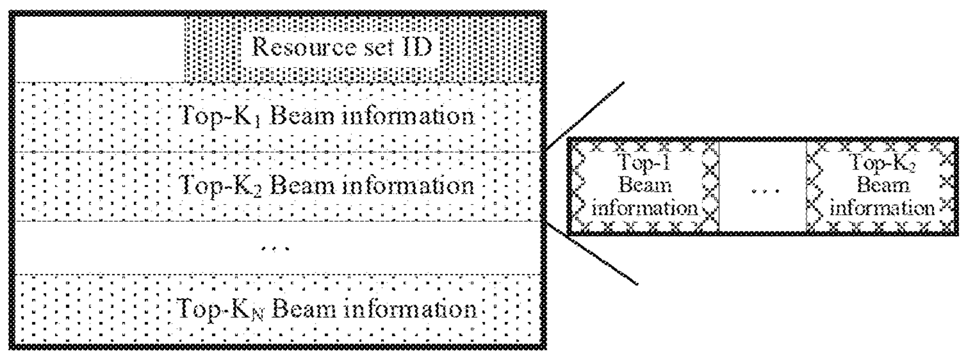
FIG. 10 is a schematic structural diagram of a further possible implementation of the first information.
FIG. 11 is a schematic structural diagram of yet another possible implementation of the first information.
FIG. 12 is a schematic structural diagram of still another possible implementation of the first information.

Referring to FIG. 10, the first information also includes two types of fields arranged in parallel. The first type of field indicates the resource set ID, which is the identifier of the second resource set. The second type of field concurrently indicates the N beam information sets corresponding one-to-one with the N second-type time instances, namely, a beam information set 1 to a beam information set N. The contents of each beam information set are the same as those in FIG. 8 and will not be repeated here.

The above description, in conjunction with FIG. 10, illustrates the method for reporting first information that includes N second-type time instances and the identifier of the second resource set. Compared to the first embodiment, this embodiment saves some signaling overhead.

Third Embodiment

Since the geographical location and the surrounding environment of the terminal device do not change significantly within a prediction window/cycle/phase, many of the beam information items in the N beam information sets may be the same. That is, many of the beam information items in the N sets of Top-$K_i$ beam information corresponding to the N second-type time instances may be identical. In this scenario, the first embodiment and the second embodiment may result in redundant signaling overhead due to the repetition of indications.

Considering that the predicted beams persist for a period of time and are limited within a certain prediction cycle, the present disclosure proposes a method for reporting first information which is primarily the beam information.

In some embodiments, the first information may include $K_T$ beam information items and $K_T$ sets of time instances. For example, the $K_T$ beam information items may belong to or constitute multiple pieces of second-type beam information. The $K_T$ beam information items may be determined based on prediction results of N second-type time instances.

In some embodiments, any one of the $K_T$ beams is one of the L beams. The L beams are the L beams at the i-th second-type time instance among the N second-type time instances, or the L beams at the j-th second-type time instance among the N second-type time instances.

In some embodiments, the $K_T$ beams are a subset of the L beams. In one implementation, the $K_T$ beams are the aforementioned L beams. In another implementation, the value of $K_T$ is less than the value of L.

In some embodiments, the $K_T$ beams are the L beams at the i-th second-type time instance among the N second-type time instances, or the $K_T$ beams are the L beams at the j-th second-type time instance among the N second-type time instances.

In some embodiments, the $K_T$ beams have the highest predicted signal quality over the N second-type time instances.

In some embodiments, the $K_T$ beams have the highest predicted average RSRP value over the N second-type time instances.

In some embodiments, the $K_T$ beams have the highest predicted average L1-RSRP value over the N second-type time instances.

In some embodiments, any beam among the $K_T$ beams has a predicted signal quality that is greater than that of any beam among the L beams excluding the $K_T$ beams, over the N second-type time instances.

In some embodiments, any beam among the $K_T$ beams has a predicted average RSRP value that is greater than that of any beam among the L beams excluding the $K_T$ beams, over the N second-type time instances.

In some embodiments, any beam among the $K_T$ beams has a predicted average L1-RSRP value that is greater than that of any beam among the L beams excluding the $K_T$ beams, over the N second-type time instances.

In some embodiments, any beam among the $K_T$ beams has a predicted maximum RSRP value that is greater than that of any beam among the L beams excluding the $K_T$ beams, over the N second-type time instances.

In some embodiments, any beam among the $K_T$ beams has a predicted maximum L1-RSRP value that is greater than that of any beam among the L beams excluding the $K_T$ beams, over the N second-type time instances.

In some embodiments, the N second-type time instances respectively correspond to N sets of beams. The N sets of beams include $N \times K_i$ strongest beams. The multiple pieces of second-type beam information correspond to beam information of $K_T$ beams. The $K_T$ beams are either all distinct beams among the $N \times K_i$ strongest beams, or the Kr beams are the $K_T$ strongest beams in terms of signal quality among the $N \times K_i$ strongest beams.

In some embodiments, the $K_T$ beam information items indicate the L beams at the i-th second-type time instance among the N second-type time instances, or the $K_T$ distinct beams among the $N \times K_i$ strongest beams. That is, the $K_T$ beams may be the L beams, or may be all distinct beams among the N sets of Top-$K_i$ beams predicted across the N time instances. In such a scenario, the value of $K_T$ is constant, and the signaling overhead of the first information remains constant.

In some embodiments, the first information includes information of the L beams corresponding to the $K_T$ beam information items.

In some embodiments, the $K_T$ beams are determined based on the signal quality of all of the $N \times K_i$ strongest beams across the N second-type time instances. Therefore, the $K_T$ beams may also be referred to as the Top-$K_T$ beams.

In some embodiments, the $K_T$ beam information items indicate the L beams predicted over the N second-type time instances, or the $K_T$ distinct beams among the $N \times K_i$ strongest beams.

In some embodiments, the $K_T$ beams may be determined based on the signal quality of all distinct beams among the N second-type time instances. That is, the $K_T$ beams may be the Top-$K_T$ beams among all beams.

In some embodiments, the signal quality of any beam is an aggregated RSRP of the beam over the N second-type time instances.

In some embodiments, the Top-$K_T$ beams may be determined based on the effective average RSRP values of all beams in the N sets of Top-$K_i$ beams over the N second-type time instances. For example, each beam among all the beams has an effective average value over the N second-type time instances. The beams among all the beams whose effective average signal quality is greater than a second threshold are identified as the Top-$K_T$ beams.

For example, if one beam $K_j$ in the N sets of Top-$K_i$ beams starts from a time instance #2 and lasts for 5 time instances, the aggregated RSRP corresponding to the beam $K_j$ is the predicted RSRP of beam $K_j$ over these 5 time instances and its average value. When the 5 RSRP values are L1-RSRP1, L1-RSRP2, . . . , L1-RSRP5, the average value is the mean of these five L1-RSRP values. All distinct beams among the N sets of Top-$K_i$ beams are sorted according to their corresponding aggregated RSRP values, and the $K_T$ beam information items are selected for reporting the inference results.

In some embodiments, the Top-$K_T$ beams may be determined based on the total RSRP values of all beams in the N sets of Top-$K_i$ beams over the N second-type time instances. For example, the Top-$K_T$ beams are the $K_T$ beams with the highest total RSRP values among all beams.

For example, the aggregated RSRP corresponding to beam $K_j$ is the sum of the 5 RSRP values predicted for the beam $K_j$ over these 5 time instances. All distinct beams among the N sets of Top-$K_i$ beams are sorted according to their corresponding total RSRP values, and the $K_T$ beam information items are selected for reporting the inference results.

In some embodiments, the $K_T$ beam information items indicate the L beams at the i-th second-type time instance among the N second-type time instances, or the $K_T$ distinct beams whose signal quality is greater than the first threshold among the $N \times K_i$ beams. That is, the $K_T$ beams may be the L beams at the i-th second-type time instance among the N second-type time instances, or the Top-$K_T$ distinct beams among the N sets of Top-$K_i$ beams. In such a scenario, the value of $K_T$ varies, and the signaling overhead of the first information varies. For example, when there are more beams with signal quality greater than the first threshold, the $K_T$ value is larger.

In some embodiments, the number of $K_T$ distinct beams decreases as the first threshold increases.

In some embodiments, the $K_T$ beam information items indicate the L beams predicted over the N second-type time instances, or the $K_T$ distinct beams whose signal quality is greater than the first threshold among the N×$K_i$ beams. In some embodiments, the $K_T$ beam information items indicate the L beams predicted over the N second-type time instances, or the $K_T$ distinct beams with the highest signal quality among the N×$K_i$ beams.

In some embodiments, the $K_T$ of time instance sets correspond to the $K_T$ beam information items, respectively. Exemplarily, the $K_T$ time instance sets one-to-one correspond to the $K_T$ beam information items. That is, each beam information in the $K_T$ beam information corresponds to one time instance set.

In some embodiments, a time instance set may include one or more time instances. The one or more time instances may be partially continuous, entirely continuous, or entirely non-continuous.

In some embodiments, a time instance set may be indicated by one or more of the following types of information: a start time instance, a duration, an end time instance (also referred to as a terminating time instance), the number of time instances, or a time instance interval. The $K_T$ time instance sets in the first information may be indicated in various ways based on such information.

In some embodiments, any time instance set among the $K_T$ time instance sets includes a start time instance and a duration. That is, the first information may include the $K_T$ beam information items and the corresponding start time instance and duration for each of the $K_T$ beam information item.

In some embodiments, the duration includes at least one time instance. In some embodiments, the duration includes a plurality of continuous time instances. In some embodiments, the duration includes a plurality of non-continuous time instances.

In some embodiments, at least two time instance sets among the $K_T$ time instance sets include different start time instances.

In some embodiments, at least two time instance sets among the $K_T$ time instance sets include the same start time instance.

In some embodiments, when a certain beam information item corresponds to multiple groups of continuous time instances, the start time instance may be the earliest time instance among any of the groups of continuous time instances, and the duration may be the length of that group of continuous time instances.

In some embodiments, when a certain beam information item corresponds to multiple groups of continuous time instances, the start time instance may be the earliest time instance in any one of the groups of continuous time instances, and the duration may be the total length of one or more groups of continuous time instances including that group.

In some embodiments, when a certain beam information item corresponds to multiple groups of continuous time instances, the start time instance may be the earliest time instance in the earliest group of continuous time instances, and the duration may be the length of that group of continuous time instances.

In some embodiments, when a certain beam information item corresponds to multiple groups of continuous time instances, the start time instance may be the earliest time instance in the earliest group of continuous time instances, and the duration may be the total length of the multiple groups of continuous time instances.

In some embodiments, the beams may have the equal or different durations, this is not limited herein.

In some embodiments, at least two time instance sets among the $K_T$ time instance sets include different durations.

In some embodiments, any two time instance sets among the $K_T$ time instance sets include the equal duration.

In some embodiments, any time instance set among the $K_T$ time instance sets includes a start time instance and an end time instance. That is, the first information includes the $K_T$ beam information, and the corresponding start time instance and end time instance for each of the $K_T$ beam information items.

In some embodiments, at least two time instance sets among the $K_T$ time instance sets include different end time instances.

In some embodiments, at least two time instance sets among the $K_T$ time instance sets include the same end time instance.

In some embodiments, when a certain beam information item corresponds to multiple groups of continuous time instances, the start time instance may be the earliest time instance in any one of the groups of continuous time instances, and the end time instance may be the latest time instance in that group of continuous time instances. In some embodiments, when a certain beam information item corresponds to multiple groups of continuous time instances, the start time instance may be the earliest time instance in any one of the groups of continuous time instances, and the end time instance may be the latest time instance among all of the groups of continuous time instances.

For ease of understanding, exemplary descriptions of beam information based reporting are provided below with reference to FIG. 11 and FIG. 12.

Referring to FIG. 11, the first information includes $K_T$ fields arranged in parallel, corresponding to $K_T$ beam information items. Each field among the $K_T$ fields may indicate the respective beam information, as well as the corresponding start time instance and duration.

Referring to FIG. 12, the first information also includes $K_T$ fields arranged in parallel, corresponding to $K_T$ beam information items. Each field among the $K_T$ fields may indicate the respective beam information, as well as the corresponding start time instance and end time instance.

As shown in FIG. 11 and FIG. 12, in the third embodiment, the reporting is primarily based on beam information, which can avoid redundant indication of beam information and help reduce signaling overhead.

Fourth Embodiment

As described above, beam management primarily performs prediction for downlink beams in the beam set A. Since the beams in the beam set are relatively fixed, the first information may not directly indicate beam information, and instead indicate the beam information through an index or identifier (ID) of reporting configurations. Exemplarily, the identifier of the reporting configuration may indicate one reporting configuration among multiple reporting configurations.

In some embodiments, each reporting configuration may be used to set reporting content. The reporting content may include at least one resource configuration. The at least one resource configuration is used to determine the resources occupied by the $K_T$ beams. That is, each reporting configuration may correspond to different $K_T$ beams through the resource configuration. The $K_T$ beams may be determined according to the method in the third embodiment.

In some embodiments, each resource configuration includes the resources occupied by the downlink transmission beams in the beam set A used for CSI-RS or SSB during the AI/ML model training phase. That is, the reporting configuration may include a CRI or an SSBRI.

In some embodiments, the first information may include an identifier of a first reporting configuration and $K_T$ time instance sets. Any time instance set among the $K_T$ time instance sets may include one or more of the following: a start time instance and a duration; or a start time instance and an end time instance. The $K_T$ time instance sets may be determined according to the method in the third embodiment.

In some embodiments, the first reporting configuration is any one of multiple reporting configurations. The identifier of the first reporting configuration may also be referred to as a reporting configuration ID.

In some embodiments, the first information may include a reporting configuration index and the corresponding start time instance and either a duration or an end time instance. That is, the first information may include an identifier of a first reporting configuration, the start time instances corresponding to the $K_T$ beams, and either the durations or the end time instances corresponding to the $K_T$ beams.

For ease of understanding, an exemplary description of the reporting method in which the first information includes a reporting configuration identifier is provided below with reference to FIG. 13.

Figure 13:
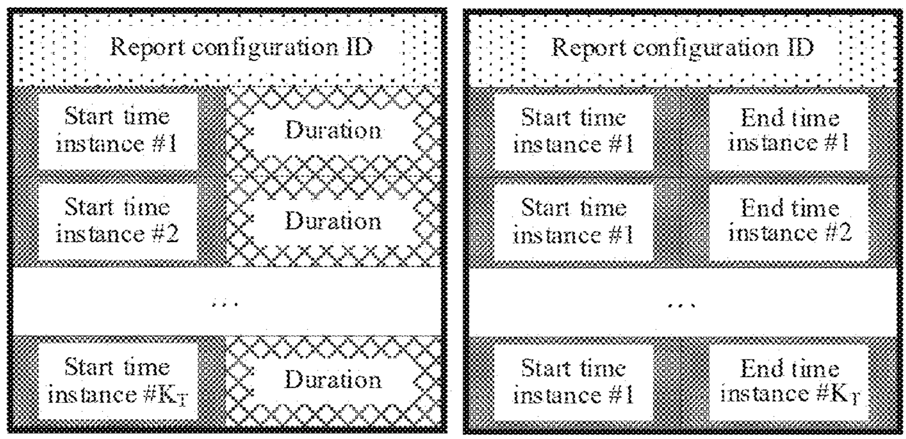
FIG. 13 is a schematic structural diagram of an additional possible implementation of the first information.

Referring to FIG. 13, the first information may include two types of fields arranged in parallel. A first type of field is used to indicate the identifier of the first reporting configuration. A second type of field may indicate, in parallel, $K_T$ fields corresponding to the $K_T$ time instance information items. In the left diagram of FIG. 13, each of the $K_T$ fields may respectively indicate a start time instance and a duration. In the right diagram of FIG. 13, each of the $K_T$ fields may respectively indicate a start time instance and an end time instance. The first information may include either type or both types of information shown in FIG. 13.

As shown in FIG. 13, the fourth embodiment does not require reporting of specific beam information, which can further reduce signaling overhead.

The method embodiments of the present disclosure have been described in detail above with reference to FIG. 1 to FIG. 13. Below, the device embodiments of the present disclosure will be described in detail with reference to FIG. 14 to FIG. 17. It should be understood that the descriptions of the method embodiments correspond to those of the device embodiments, and therefore, details not explicitly described herein may be referred to in the preceding method embodiments.

Figure 14:
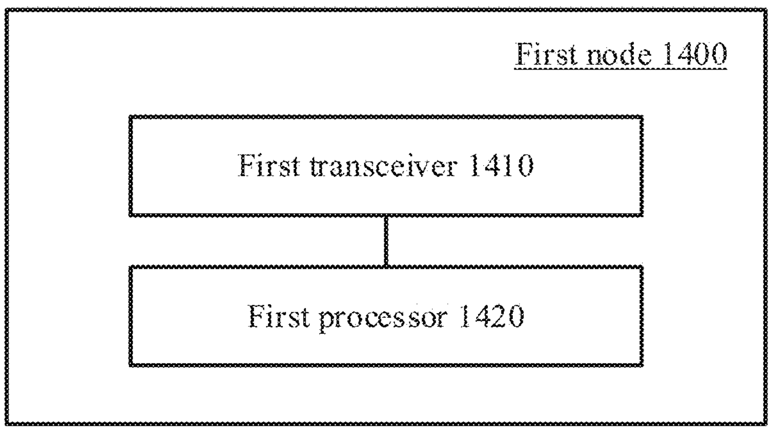
FIG. 14 is a schematic structural diagram of a first node for wireless communications according to some embodiments of the present disclosure.

FIG. 14 illustrates a first node for wireless communications according to some embodiments of the present disclosure. As shown in FIG. 14, the first node 1400 includes a first transceiver 1410 and a first processor 1420.

The first transceiver 1410 is configured to receive first configuration signaling, where the first configuration signaling indicates a first resource set.

The first processor 1420 is configured to perform measurement on the first resource set, where the first resource set is located over a plurality of first-type time instances.

The first transceiver 1410 is further configured to send first information, where the first information indicates N second-type time instances and a plurality pieces of second-type beam information. None of the N second-type time instances is earlier than the last first-type time instance among the plurality of first-type time instances, and N is a positive integer. The measurement result for the first resource set is used to determine the plurality pieces of second-type beam information. The plurality pieces of second-type beam information correspond to the N second-type time instances.

In some embodiments, the plurality pieces of second-type beam information is determined based on a first model.

In some embodiments, the measurement result for the first resource set is used by the first model to determine the plurality pieces of second-type beam information.

In some embodiments, the first transceiver 1410 is further configured to receive second configuration signaling, where the second configuration signaling indicates a plurality pieces of first-type beam information. The first resource set includes a plurality of resources, and the plurality of resources are respectively associated with the plurality pieces of first-type beam information.

In some embodiments, any piece of second-type beam information among the plurality pieces of second-type beam information is one or more of the following: a beam identifier or beam index, a channel state information-reference signal resource indication, a synchronization signal/physical broadcast channel block resource indication, a transmission configuration indication, a transmission configuration indication state, and a transmission configuration indication state identifier.

In some embodiments, the plurality pieces of second-type beam information is in N beam information sets, and the N beam information sets correspond one-to-one to the N second-type time instances.

In some embodiments, the N second-type time instances include a first time instance. A first beam information set is a beam information set, among the N beam information sets, corresponding to the first time instance. The first beam information set includes beam information of one or more strongest beams among L beams at the first time instance, where L is greater than 1.

In some embodiments, the one or more strongest beams are: the K beams with the highest signal quality among the L beams at the first time instance; or beams, among the K beams with the highest signal quality among the L beams at the first time instance, whose signal quality is greater than a first threshold; or K beams, among the L beams at the first time instance, whose signal quality is greater than a first threshold, where K is greater than or equal to 1.

In some embodiments, the i-th beam information set among the N beam information sets includes beam information of $K_i$ strongest beams among L beams at the i-th second-type time instance among the N second-type time instances, where $1 \le i \le N$ and $K_i \ge 1$. At least two beam information sets among the N beam information sets are different, or at least two beam information sets correspond to different values of $K_i$.

In some embodiments, the first information includes the N beam information sets and the N second-type time instances, with the N second-type time instances corresponding one-to-one to the N beam information sets.

In some embodiments, the first information indicates a second resource set and a plurality pieces of second-type beam information, where the second resource set is located over the N second-type time instances.

In some embodiments, the first information includes an identifier of the second resource set, and the identifier of the second resource set is used to determine the N second-type time instances.

In some embodiments, the plurality pieces of second-type beam information include N beam information sets. Any beam information set among the N beam information sets includes beam information of $K_j$ strongest beams among L beams at the j-th second-type time instance among the N second-type time instances, where $1 \leq j \leq N$ and $K_j \geq 1$.

In some embodiments, the first information includes $K_T$ beam information items and $K_T$ time instance sets, where the $K_T$ time instance sets respectively correspond to the $K_T$ beam information items.

In some embodiments, the $K_T$ beam information items indicate either the L beams at the i-th second-type time instance among the N second-type time instances, or $K_T$ distinct beams among the $N \times K_i$ strongest beams.

In some embodiments, the $K_T$ beam information items indicate either the L beams at the i-th second-type time instance among the N second-type time instances, or $K_T$ distinct beams, whose signal quality is greater than a first threshold, among the N & K; beams.

In some embodiments, any time instance set among the $K_T$ time instance sets includes a start time instance and a duration.

In some embodiments, any time instance set among the $K_T$ time instance sets includes a start time instance and an end time instance.

In some embodiments, the first information includes an identifier of a first reporting configuration and the $K_T$ time instance sets. Any time instance set among the $K_T$ time instance sets includes one or more of the following: a start time instance and a duration; or a start time instance and an end time instance.

Figure 16:
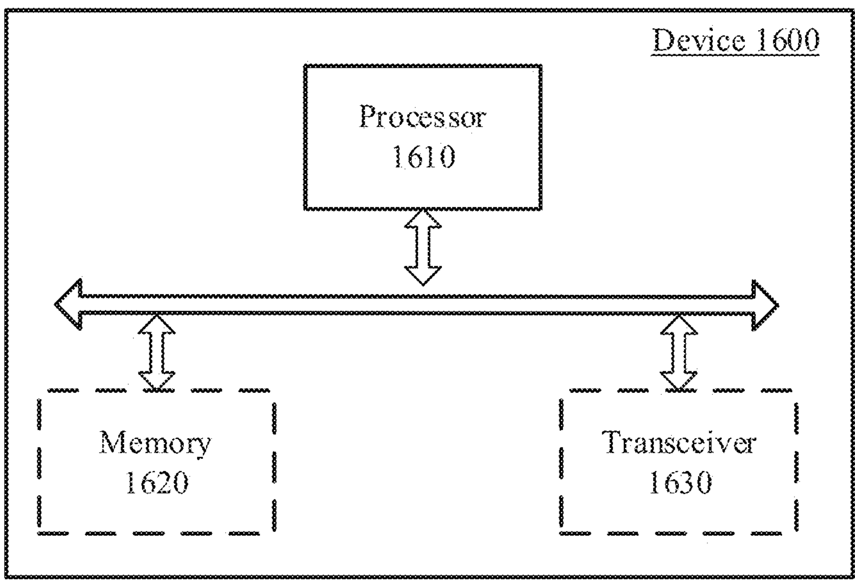
FIG. 16 is a schematic structural diagram of a device according to some embodiment of the present disclosure.

In some embodiments, the first transceiver 1410 may be a transceiver 1630, and the first processor 1420 may be a processor 1610. The first node 1400 may further include the processor 1610 and a memory 1620, as shown in FIG. 16.

Figure 15:
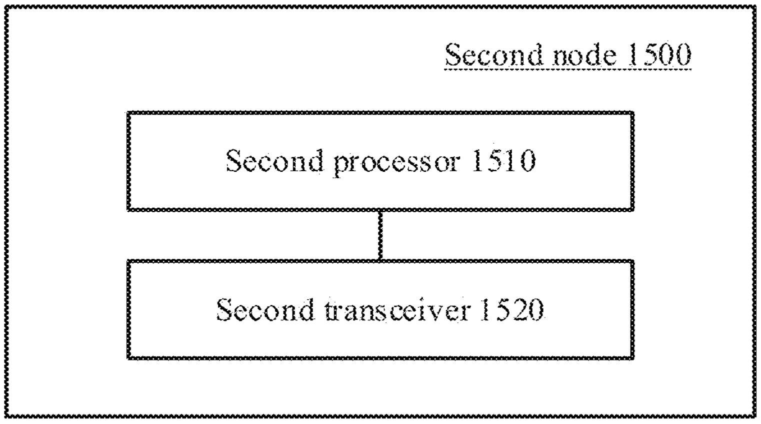
FIG. 15 is a schematic structural diagram of a second node for wireless communications according to some embodiments of the present disclosure.

FIG. 15 illustrates a second node for wireless communications according to some embodiments of the present disclosure. As shown in FIG. 15, the second node 1500 includes a second processor 1510 and a second transceiver 1520.

The second processor 1510 is configured to determine first configuration signaling, where the first configuration signaling indicates a first resource set.

The second transceiver 1520 is configured to perform beam transmission based on the first resource set, and the first resource set is located over a plurality of first-type time instances.

The second transceiver 1520 is further configured to receive first information, where the first information indicates N second-type time instances and a plurality pieces of second-type beam information. The plurality pieces of first-type time instances are earlier than the N second-type time instances, and N is a positive integer. The measurement result for the first resource set is used to determine the plurality pieces of second-type beam information. The plurality pieces of second-type beam information correspond to the N second-type time instances.

In some embodiments, the plurality pieces of second-type beam information is determined based on a first model.

In some embodiments, the measurement result for the first resource set is used by the first model to determine the plurality pieces of second-type beam information.

In some embodiments, the second processor 1510 is further configured to determine second configuration signaling, where the second configuration signaling indicates a plurality pieces of first-type beam information. The first resource set includes a plurality of resources, and the plurality of resources are respectively associated with the plurality pieces of first-type beam information.

In some embodiments, any second-type beam information among the plurality pieces of second-type beam information is one or more of the following: a beam identifier or beam index; a channel state information-reference signal resource indication; a synchronization signal/physical broadcast channel block resource indication; a transmission configuration indication; a transmission configuration indication state; or a transmission configuration indication state identifier.

In some embodiments, the plurality pieces of second-type beam information is in N beam information sets, and the N beam information sets correspond one-to-one to the N second-type time instances.

In some embodiments, the N second-type time instances include a first time instance. A first beam information set is a beam information set, among the N beam information sets, corresponding to the first time instance. The first beam information set includes beam information of one or more strongest beams among L beams at the first time instance, where L is greater than 1.

In some embodiments, the one or more strongest beams are: the K beams with the highest signal quality among the L beams at the first time instance; or beams, among the K beams with the highest signal quality among the L beams at the first time instance, whose signal quality is greater than a first threshold; or K beams, among the L beams at the first time instance, whose signal quality is greater than a first threshold, where K is greater than or equal to 1.

In some embodiments, the i-th beam information set among the N beam information sets includes beam information of $K_i$ strongest beams among L beams at the i-th second-type time instance among the N second-type time instances, where $1 \leq i \leq N$ and $K_i \geq 1$. At least two beam information sets among the N beam information sets are different, or at least two beam information sets correspond to different values of $K_i$.

In some embodiments, the first information includes the N beam information sets and the N second-type time instances, with the N second-type time instances corresponding one-to-one to the N beam information sets.

In some embodiments, the first information indicates a second resource set and a plurality pieces of second-type beam information, where the second resource set is located over the N second-type time instances.

In some embodiments, the first information includes an identifier of the second resource set, and the identifier of the second resource set is used to determine the N second-type time instances.

In some embodiments, the plurality pieces of second-type beam information include N beam information sets. Any beam information set among the N beam information sets includes beam information of $K_j$ strongest beams among L beams at the j-th second-type time instance among the N second-type time instances, where $1 \leq j \leq N$ and $K_j \geq 1$.

In some embodiments, the first information includes $K_T$ beam information items and $K_T$ time instance sets, where the $K_T$ time instance sets respectively correspond to the $K_T$ beam information items.

In some embodiments, the $K_T$ beam information items indicate either the L beams at the i-th second-type time instance among the N second-type time instances, or $K_T$ distinct beams among the $N \times K_i$ strongest beams.

In some embodiments, the $K_T$ beam information items indicate either the L beams at the i-th second-type time instance among the N second-type time instances, or $K_T$ distinct beams, whose signal quality is greater than a first threshold, among the $N \times K_i$ beams.

In some embodiments, any time instance set among the $K_T$ time instance sets includes a start time instance and a duration.

In some embodiments, any time instance set among the $K_T$ time instance sets includes a start time instance and an end time instance.

In some embodiments, the first information includes an identifier of a first reporting configuration and the $K_T$ time instance sets. Any time instance set among the $K_T$ time instance sets includes one or more of the following: a start time instance and a duration; or a start time instance and an end time instance.

In some embodiments, the second processor 1510 may be the processor 1610, and the second transceiver 1520 may be the transceiver 1630. The second node 1500 may further include a memory 1620, as shown in FIG. 16.

FIG. 16 is a schematic structural diagram of a communication device according to some embodiments of the present disclosure. The dashed lines in FIG. 16 indicate that the corresponding unit or module is optional. The device 1600 may be used to implement the methods described in the method embodiments above. The device 1600 may be a chip, a user device, or a network device.

The device 1600 may include one or more processors 1610. The processor 1610 may support the device 1600 in implementing the methods described in the previous method embodiments. The processor 1610 may be a general-purpose processor or a specialized processor. For example, the processor may be a central processing unit (CPU). Alternatively, the processor may also be another general-purpose processor, a digital signal processor (DSP), an application-specific integrated circuit (ASIC), a field-programmable gate array (FPGA), or other programmable logic devices, discrete gates or transistor logic devices, discrete hardware components, and the like. The general-purpose processor may be a microprocessor, or the processor may be any conventional processor.

The device 1600 may also include one or more memories 1620. The memory 1620 stores a program that can be executed by the processor 1610, enabling the processor 1610 to implement the methods described in the previous method embodiments. The memory 1620 may be independent of the processor 1610 or integrated within the processor 1610.

The device 1600 may further include a transceiver 1630. The processor 1610 may communicate with other devices or chips through the transceiver 1630. For example, the processor 1610 may perform data transmission or reception with other devices or chips via the transceiver 1630.

Figure 17:
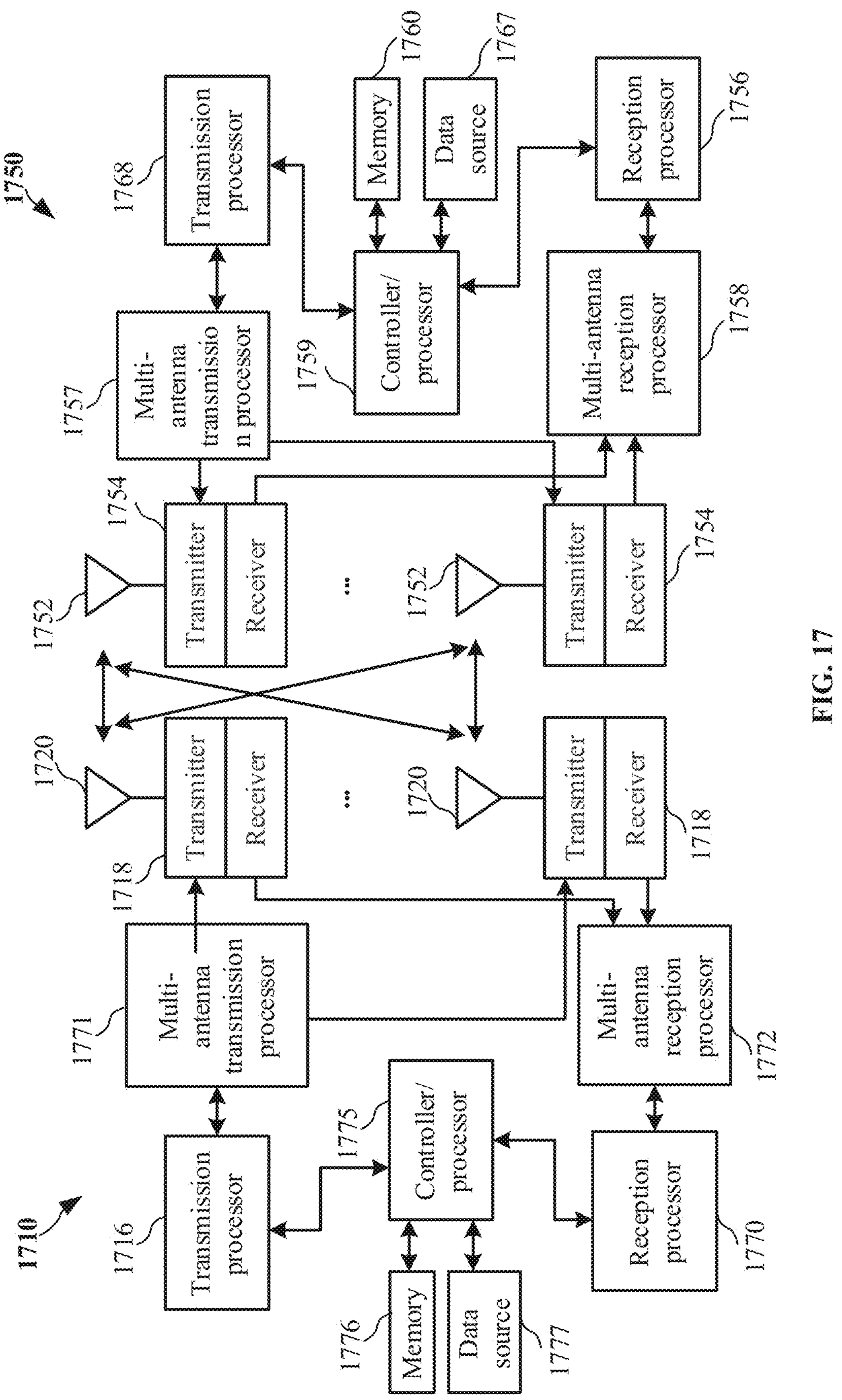
FIG. 17 is a schematic diagram of hardware modules of a communication device according to some embodiment of the present disclosure.

FIG. 17 illustrates a schematic diagram of the hardware modules of the communication device according to some embodiments of the present disclosure. Specifically, FIG. 17 shows a block diagram of the first communication device 1750 and the second communication device 1710 that communicate with each other within an access network.

The first communication device 1750 includes a controller/processor 1759, a memory 1760, a data source 1767, a transmission processor 1768, a reception processor 1756, a multi-antenna transmission processor 1757, a multi-antenna reception processor 1758, a transmitter/receiver 1754, and an antenna 1752.

The second communication device 1710 includes a controller/processor 1775, a memory 1776, a data source 1777, a reception processor 1770, a transmission processor 1716, a multi-antenna reception processor 1772, a multi-antenna transmission processor 1771, a transmitter/receiver 1718, and an antenna 1720.

In the transmission from the second communication device 1710 to the first communication device 1750, at the second communication device 1710, upper-layer data packets from the core network or upper-layer data packets from the data source 1777 are provided to the controller/processor 1775. The core network and the data source 1777 represent all protocol layers above L2 layer. The controller/processor 1775 implements the functionality of the L2 layer. In the transmission from the second communication device 1710 to the first communication device 1750, the controller/processor 1775 provides header compression, encryption, packet segmentation and reordering, multiplexing between logical and transport channels, and wireless resource allocation to the first communication device 1750 based on various priority metrics. The controller/processor 1775 is also responsible for retransmitting lost packets and signaling to the first communication device 1750. The transmission processor 1716 and the multi-antenna transmission processor 1771 implement various signal processing functions for L1 layer (i.e., the physical layer). The transmission processor 1716 implements encoding and interleaving to facilitate forward error correction at the second communication device 1710, as well as the mapping of signal clusters based on various modulation schemes (e.g., binary phase shift keying, quadrature phase shift keying, M-ary phase shift keying, M-ary quadrature amplitude modulation). The multi-antenna transmission processor 1771 performs digital spatial precoding on the encoded and modulated symbols, including codebook-based precoding, non-codebook-based precoding, and beamforming processing, generating one or more spatial streams. The transmission processor 1716 then maps each spatial stream to subcarriers, multiplexes with reference signals (e.g., pilots) in the time and/or frequency domain, and then uses an inverse fast Fourier transform to generate the physical channel for the carrier time-domain multi-carrier symbol stream. The multi-antenna transmission processor 1771 then performs transmit analog precoding/beamforming operations on the time-domain multi-carrier symbol stream. Each transmitter 1718 converts the baseband multi-carrier symbol stream provided by the multi-antenna transmission processor 1771 into radio frequency signals, which are then transmitted to different antennas 1720.

In the transmission from the second communication device 1710 to the first communication device 1750, at the first communication device 1750, each receiver 1754 receives signals through its respective antenna 1752. Each receiver 1754 recovers the information modulated onto the RF carrier and converts the RF signals into baseband multi-carrier symbol streams, which are provided to the reception processor 1756. The reception processor 1756 and the multi-antenna reception processor 1758 implement various signal processing functions for the L1 layer. The multi-antenna reception processor 1758 performs receive analog precoding/beamforming operations on the baseband multi-carrier symbol stream from the receiver 1754. The reception processor 1756 uses a fast Fourier transform to convert the baseband multi-carrier symbol stream, after the receive analog precoding/beamforming operations, from the time domain to the frequency domain. In the frequency domain, the physical layer data signals and reference signals are demultiplexed by the reception processor 1756, where the reference signals are used for channel estimation, and the data signals are recovered in the multi-antenna reception processor 1758 after multi-antenna detection, extracting any spatial stream destined for the first communication device 1750. The symbols on each spatial stream are demodulated and recovered in the reception processor 1756, generating soft decisions. The reception processor 1756 then decodes and de-interleaves the soft decisions to recover the upper-layer data and control signals transmitted by the second communication device 1710 on the physical channel. The upper-layer data and control signals are then provided to the controller/processor 1759. The controller/processor 1759 implements the functionality of the L2 layer. The controller/processor 1759 may be associated with a memory 1760, which stores program code and data. The memory 1760 may be referred to as a computer-readable medium. In the transmission from the second communication device 1710 to the first communication device 1750, the controller/processor 1759 provides multiplexing between transport and logical channels, packet reassembly, decryption, header decompression, and control signal processing to recover the upper-layer data packets from the second communication device 1710. The upper-layer data packets are then provided to all protocol layers above the L2 layer. Various control signals may also be provided to the L3 layer for L3 processing.

In the transmission from the first communication device 1750 to the second communication device 1710, at the first communication device 1750, upper-layer data packets are provided to the controller/processor 1759 using the data source 1767. The data source 1767 represents all protocol layers above the L2 layer. Similar to the transmission process described at the second communication device 1710 in the transmission from the second communication device 1710 to the first communication device 1750, the controller/processor 1759 performs header compression, encryption, packet segmentation and reordering, and multiplexing between logical channels and transport channels, and implements L2 layer functions for both the user plane and the control plane. The controller/processor 1759 is also responsible for retransmission of lost packets and signaling to the second communication device 1710. The transmission processor 1768 performs modulation mapping and channel coding processing. The multi-antenna transmission processor 1757 performs digital multi-antenna spatial precoding, including codebook-based precoding and non-codebook-based precoding, and beamforming processing. The transmission processor 1768 then modulates the resulting spatial streams into multi-carrier/single-carrier symbol streams, which are subjected to analog precoding/beamforming operations in the multi-antenna transmission processor 1757, and then provided to different antennas 1752 via the transmitter 1754. Each transmitter 1754 first converts the baseband symbol stream provided by the multi-antenna transmission processor 1757 into a radio frequency symbol stream, and then delivers the radio frequency symbol stream to the antenna 1752.

In the transmission from the first communication device 1750 to the second communication device 1710, the functionality at the second communication device 1710 is similar to the reception functionality at the first communication device 1750 as described in the transmission from the second communication device 1710 to the first communication device 1750. Each receiver 1718 receives radio frequency radio frequency signals via its respective antenna 1720, converts the received radio frequency signals into baseband signals, and provides the baseband signals to the multi-antenna reception processor 1772 and the reception processor 1770. The reception processor 1770 and the multi-antenna reception processor 1772 jointly implement the functions of the L1 layer. The controller/processor 1775 implements L2 functions. The controller/processor 1775 may be associated with a memory 1776 that stores program code and data. The memory 1776 may be referred to as a computer-readable medium. In the transmission from the first communication device 1750 to the second communication device 1710, the controller/processor 1775 performs demultiplexing between transport channels and logical channels, packet reassembly, decryption, header decompression, and control signal processing to recover upper-layer data packets from the first communication device 1750. The upper-layer data packets from the controller/processor 1775 may be provided to the core network or to all protocol layers above the L2 layer, and various control signals may also be provided to the core network or to the L3 layer for L3 processing.

In some embodiments, the first communication device 1750 includes: at least one processor and at least one memory, and the at least one memory includes computer program code. The at least one memory and the computer program code are configured to, together with the at least one processor, cause the first communication device 1750 to at least: receive first configuration signaling, the first configuration signaling indicating a first resource set; perform measurement on the first resource set, where the first resource set is located in a plurality of first-type time instances; or transmit first information, the first information indicating N second-type time instances and a plurality pieces of second-type beam information. The plurality of first-type time instances precede the N second-type time instances, and N is a positive integer. The measurement result for the first resource set is used to determine the plurality pieces of second-type beam information. The plurality pieces of second-type beam information correspond to the N second-type time instances.

In some embodiments, the first communication device 1750 includes: a memory storing computer-readable instruction code. The computer-readable instruction code, when executed by at least one processor, causes actions including: receiving first configuration signaling, the first configuration signaling indicating a first resource set; performing measurement on the first resource set, the first resource set is located over a plurality of first-type time instances; or transmitting first information, the first information indicating N second-type time instances and a plurality pieces of second-type beam information. The plurality of first-type time instances precede the N second-type time instances, and N is a positive integer. A measurement result for the first resource set is used to determine the plurality pieces of second-type beam information. The plurality pieces of second-type beam information correspond to the N second-type time instances.

In some embodiments, the first communication device 1750 corresponds to the first node in the present disclosure.

In some embodiments, the second communication device 1710 corresponds to the second node in the present disclosure.

In some embodiments, the first communication device 1750 is a terminal device, and the terminal device may serve as a relay node.

In some embodiments, the first communication device 1750 is a terminal device supporting V2X, and the terminal device may serve as a relay node. In some embodiments, the first communication device 1750 is a terminal device supporting D2D, and the terminal device may serve as a relay node. In some embodiments, the first communication device 1750 is a network-controlled relay NCR. In some embodiments, the first communication device 1750 is a relay repeater station. In some embodiments, the first communication device 1750 is a relay.

In some embodiments, the second communication device 1710 is a base station.

In some embodiments, the antenna 1752, the receiver 1754, the multi-antenna receive processor 1758, the receive processor 1756, and the controller/processor 1759 are configured to receive the first configuration signaling.

In some embodiments, the antenna 1752, the transmitter 1754, the multi-antenna transmit processor 1757, the transmit processor 1768, and the controller/processor 1759 are configured to transmit the first information.

In some embodiments, the antenna 1720, the transmitter 1718, the multi-antenna transmit processor 1771, the transmit processor 1716, and the controller/processor 1775 are configured to perform beam transmission based on the first resource set.

In some embodiments, the antenna 1720, the receiver 1718, the multi-antenna receive processor 1772, the receive processor 1770, and the controller/processor 1775 are configured to receive the first information.

In some embodiments of the present disclosure, a computer-readable storage medium is further provided for storing a program. The computer-readable storage medium may be applied to a terminal or network device provided in embodiments of the present disclosure, and the program enables a computer to implement the method performed by the terminal or the network device in various embodiments of the present disclosure.

In some embodiments of the present disclosure, a computer program product is further provided. The computer program product includes a program. The computer program product may be applied to a terminal or network device provided in embodiments of the present disclosure, and the program enables a computer to implement the method performed by the terminal or the network device in various embodiments of the present disclosure.

In some embodiments of the present disclosure, a computer program is further provided. The computer program may be applied to a terminal or network device provided in embodiments of the present disclosure, and the computer program enables a computer to implement the method performed by the terminal or the network device in various embodiments of the present disclosure.

It should be understood that the terms "system" and "network" as used in the present disclosure may be used interchangeably. In addition, the terminology used in the present disclosure is intended to describe specific embodiments only and is not intended to limit the present disclosure in any way. The terms "first," "second," "third," "fourth," etc., as used in the description and claims of the present disclosure and in the drawings, are used to distinguish between different objects and are not intended to indicate any particular order. Furthermore, the terms "comprise," "include," "have," and any variations thereof are intended to cover non-exclusive inclusions.

In the embodiments of the present disclosure, the term "indicate" may refer to a direct indication, an indirect indication, or an indication of an associated relationship. For example, "A indicates B" may mean that A directly indicates B (e.g., B may be obtained through A); or A indirectly indicates B (e.g., A indicates C, and B may be obtained through C); or that A and B have an associative relationship.

In the embodiments of the present disclosure, the expression "B corresponding to A" indicates that B is associated with A and can be determined based on A. However, it should be understood that determining B based on A does not necessarily mean that B is determined solely based on A; rather, B may be determined based on A and/or other information.

In the embodiments of the present disclosure, the term "corresponding" may indicate a direct or indirect correspondence between two entities, or may indicate an associative relationship between them. The correspondence may also refer to relationships such as indicating and being indicated, configuring and being configured, etc.

In the embodiments of the present disclosure, the terms "predefined" or "preconfigured" may refer to an implementation in which corresponding code, tables, or other means for indicating relevant information are pre-stored in a device (e.g., including user equipment or a network device). The present disclosure places no limitation on the specific manner of such implementation. For example, "predefined" may refer to being defined in a protocol.

In the embodiments of the present disclosure, the term "protocol" may refer to standard communication protocols in the field of telecommunications, such as LTE protocols, NR protocols, and relevant protocols applicable to future communication systems. The present disclosure does not impose any limitation in this regard.

In the embodiments of the present disclosure, the term "and/or" is merely a description of the relationship between associated objects and indicates that three relationships may exist. For example, "A and/or B" can represent: A alone, both A and B, or B alone. Additionally, the character "/" generally indicates an "OR" relationship between the associated objects.

In the various embodiments of the present disclosure, the numbering of the processes does not imply the execution sequence. The execution order of the processes should be determined based on their functionality and inherent logic, and should not impose any limitations on the implementation of the embodiments of the present disclosure.

In several embodiments provided in the present disclosure, it should be understood that the disclosed systems, devices, and methods can be implemented in other ways. For example, the device embodiments described above are merely illustrative. The division of the units is only a logical functional division, and in actual implementation, other divisions can be used. For instance, multiple units or components may be combined or integrated into another system, or some features may be omitted or not executed. Additionally, the couplings or direct couplings or communication connections between the units or components shown or discussed may be indirect couplings or communication connections through interfaces, devices, or units, and can be electrical, mechanical, or in other forms.

The units described as separate components may or may not be physically separated. The components shown as units may or may not be physical units, meaning they can be located in one place or distributed across multiple network units. Depending on the actual needs, some or all of these units may be selected to achieve the objectives of the embodiments of the present disclosure.

Additionally, in various embodiments of the present disclosure, the functional units may be integrated into a single processing unit, or the individual units may physically exist separately, or two or more units may be integrated into a single unit.

In the above embodiments, the system may be implemented entirely or partially through software, hardware, firmware, or any combination thereof. When implemented using software, it may be entirely or partially realized in the form of a computer program product. The computer program product includes one or more computer instructions. When these computer program instructions are loaded and executed on a computer, they will generate, in whole or in part, the processes or functions as described in the embodiments of the present disclosure. The computer may be a general-purpose computer, a dedicated computer, a computer network, or any other programmable device. The computer instructions may be stored in a computer-readable storage medium or transmitted from one computer-readable storage medium to another. For example, the computer instructions may be transmitted from a website, computer, server, or data center to another website, computer, server, or data center via wired methods (such as coaxial cables, fiber optics, digital subscriber lines (DSL)) or wireless methods (such as infrared, wireless, microwave, etc.). The computer-readable storage medium may be any available medium that can be read by the computer or a data storage device like a server or data center that contains one or more integrated available media. The available media may include magnetic media (e.g., floppy disks, hard drives, magnetic tapes), optical media (e.g., digital versatile discs (DVD)), or semiconductor media (e.g., solid-state disks (SSD)), etc.

A person skilled in the art may understand that all or part of the operations in the methods described above can be performed by instructing the relevant hardware using a program. The program may be stored in a computer-readable storage medium, such as read-only memory, hard drives, or optical disks. Optionally, all or part of the operations in the above embodiments may also be implemented using one or more integrated circuits. Correspondingly, the various modules in the embodiments above may be implemented in hardware form or in the form of software functional modules. The present disclosure is not limited to any specific combination of software and hardware forms. The first node in the present disclosure includes but is not limited to mobile phones, tablets, laptops, USB dongles, low-power devices, enhanced machine-type communication (eMTC) devices, narrowband internet of things (NB-IoT) devices, vehicular communication devices, aircraft, drones, unmanned aerial vehicles, remote-controlled aircraft, and other wireless communication devices. The second node in the present disclosure includes but is not limited to mobile phones, tablets, laptops, USB dongles, low-power devices, eMTC devices, NB-IoT devices, vehicular communication devices, aircraft, drones, unmanned aerial vehicles, remote-controlled aircraft, and other wireless communication devices. The user equipment (UE) or terminal in the present disclosure includes but is not limited to mobile phones, tablets, laptops, USB dongles, low-power devices, eMTC devices, NB-IoT devices, vehicular communication devices, aircraft, drones, unmanned aerial vehicles, remote-controlled aircraft, and other wireless communication devices. The base station device or network-side device in the present disclosure includes but is not limited to macrocell base stations, microcell base stations, home base stations, relay base stations, eNB, gNB, TRP, the global navigation satellite system (GNSS), relay satellites, satellite base stations, aerial base stations, and other wireless communication devices.

Only specific embodiments of the present disclosure are described above, but the scope of protection of the present disclosure is not limited thereto. A person skilled in the art, within the technical scope disclosed in this application, can easily conceive of variations or substitutions, and such variations or substitutions should fall within the scope of protection of the present disclosure. Therefore, the scope of protection of the present disclosure should be determined by the scope of the claims.

What is claimed is:

1. A method, comprising:

receiving first configuration signaling, wherein the first configuration signaling indicates a first resource set;

performing measurement on the first resource set, wherein the first resource set is located over a plurality of first-type time instances; and transmitting first information, wherein the first information indicates N second-type time instances and a plurality pieces of second-type beam information, wherein the first information comprises N beam information sets and the N second-type time instances, and the N second-type time instances correspond to the N beam information sets on a one-to-one basis;

wherein the plurality of first-type time instances are earlier than the N second-type time instances, and N is a positive integer;

a measurement result for the first resource set is used to determine the plurality pieces of second-type beam information; and the plurality pieces of second-type beam information correspond to the N second-type time instances.

2. The method according to claim 1, wherein the plurality pieces of second-type beam information are determined based on a first model.

3. The method according to claim 2, wherein the measurement result for the first resource set is used by the first model to determine the plurality pieces of second-type beam information.

4. The method according to claim 1, further comprising:

receiving second configuration signaling, wherein the second configuration signaling indicates a plurality pieces of first-type beam information, and the first resource set comprises a plurality of resources respectively associated with the plurality pieces of first-type beam information.

5. The method according to claim 1, wherein each of the plurality pieces of second-type beam information comprises one or more of the following:

a beam identifier or beam index;

a channel state information-reference signal resource indication;

a synchronization signal/physical broadcast channel block resource indication;

a transmission configuration indication;

a transmission configuration indication state;

a downlink transmission configuration indication state;

an uplink transmission configuration indication state; or a transmission configuration indication state identifier.

6. The method according to claim 1, wherein the plurality pieces of second-type beam information are from the N beam information sets.

7. The method according to claim 6, wherein the N second-type time instances comprise a first time instance, a first beam information set is one of the N beam information sets that corresponds to the first time instance, and the first beam information set comprises beam information of at least one strongest beam among L beams at the first time instance, wherein L is an integer that is greater than 1.

8. The method according to claim 7, wherein the at least one strongest beam comprises:

K beams that have highest signal qualities, among the L beams at the first time instance;

a beam, whose signal quality is greater than a first threshold, among K beams having the highest signal qualities among the L beams at the first time instance; or K beams, whose signal qualities are greater than a first threshold, among the L beams at the first time instance, wherein K is an integer that is greater than or equal to 1.

9. The method according to claim 6, wherein an i-th beam information set among the N beam information sets comprises beam information of $K_i$ strongest beams among L beams at an i-th second-type time instance among the N second-type time instances, wherein i is an integer, and $1 \le i \le N$ and $K_i \ge 1$, and wherein at least two beam information sets among the N beam information sets are different, or at least two beam information sets among the N beam information sets have distinct values of $K_i$.

10. The method according to claim 1, wherein the first information indicates a second resource set and the plurality pieces of second-type beam information, and the second resource set is located over the N second-type time instances.

11. The method according to claim 10, wherein the first information comprises an identifier of the second resource set, and the identifier of the second resource set is used to determine the N second-type time instances.

12. The method according to claim 10, wherein the plurality pieces of second-type beam information comprise the N beam information sets, and any beam information set among the N beam information sets comprises beam information of $K_j$ strongest beams among L beams at a j-th second-type time instance among the N second-type time instances, wherein j is an integer and $1 \le j \le N$ and $K_j \ge 1$.

13. The method according to claim 1, wherein the first information comprises $K_T$ beam information items and $K_T$ time instance sets, and the $K_T$ time instance sets respectively correspond to the $K_T$ beam information items.

14. The method according to claim 13, wherein the $K_T$ beam information items indicate $K_T$ distinct beams among L beams at an i-th second-type time instance among the N second-type time instances; or the $K_T$ beam information items indicate $K_T$ distinct beams among $N \times K_i$ strongest beams.

15. The method according to claim 13, wherein the $K_T$ beam information items indicate $K_T$ distinct beams, whose signal quality is greater than a first threshold, among L beams at an i-th second-type time instance among the N second-type time instances; or the $K_T$ beam information items indicate $K_T$ distinct beams, whose signal quality is greater than a first threshold, among $N \times K_i$ beams.

16. The method according to claim 13, wherein each time instance set among the $K_T$ time instance sets comprises a start time instance and a duration.

17. The method according to claim 13, wherein each time instance set among the $K_T$ time instance sets includes a start time instance and an end time instance.

18. The method according to claim 13, wherein the first information comprises an identifier of a first reporting configuration and the $K_T$ time instance sets, and each time instance set among the $K_T$ time instance sets comprises one or more of: a start time instance and a duration; or a start time instance and an end time instance.

19. A method, comprising:

determining first configuration signaling, wherein the first configuration signaling indicates a first resource set;

performing beam transmission based on the first resource set, wherein the first resource set is located over a plurality of first-type time instances; and receiving first information, wherein the first information indicates N second-type time instances and a plurality pieces of second-type beam information, wherein the plurality of first-type time instances are earlier than the N second-type time instances, N being a positive integer; and the plurality pieces of second-type beam information correspond to the N second-type time instances, wherein the first information comprises N beam information sets and the N second-type time instances, and the N second-type time instances correspond to the N beam information sets on a one-to-one basis.

20. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

receiving first configuration signaling, wherein the first configuration signaling indicates a first resource set;

performing measurement on the first resource set, wherein the first resource set is located over a plurality of first-type time instances; and transmitting first information, wherein the first information indicates N second-type time instances and a plurality pieces of second-type beam information, wherein the first information comprises N beam information sets and the N second-type time instances, and the N second-type time instances correspond to the N beam information sets on a one-to-one basis;

wherein the plurality of first-type time instances are earlier than the N second-type time instances, and N is a positive integer;

a measurement result for the first resource set is used to determine the plurality pieces of second-type beam information; and the plurality pieces of second-type beam information correspond to the N second-type time instances.

* * * * *